(12) United States Patent
Yasuma et al.

(10) Patent No.: US 8,270,774 B2
(45) Date of Patent: Sep. 18, 2012

(54) IMAGE PROCESSING DEVICE FOR PERFORMING INTERPOLATION

(75) Inventors: Fumihito Yasuma, Tokyo (JP); Tomoo Mitsunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 1115 days.

(21) Appl. No.: 12/057,211

(22) Filed: Mar. 27, 2008

(65) Prior Publication Data

US 2008/0247671 A1 Oct. 9, 2008

(30) Foreign Application Priority Data

Apr. 5, 2007 (JP) ................................ P2007-098996

(51) Int. Cl.
*G06K 9/00* (2006.01)
*G06K 9/32* (2006.01)

(52) U.S. Cl. .......................... 382/300; 382/162; 382/299

(58) Field of Classification Search .......................... None
See application file for complete search history.

(56) References Cited

U.S. PATENT DOCUMENTS

| 5,552,827 | A | 9/1996 | Maenaka et al. | |
|---|---|---|---|---|
| 6,563,538 | B1 * | 5/2003 | Utagawa | 348/273 |
| 7,088,392 | B2 * | 8/2006 | Kakarala et al. | 348/272 |
| 7,477,803 | B2 * | 1/2009 | Tajima | 382/300 |
| 7,551,214 | B2 * | 6/2009 | Hasegawa | 348/280 |
| 7,825,965 | B2 * | 11/2010 | Achong et al. | 348/246 |
| 2003/0160875 | A1 * | 8/2003 | Mitsunaga et al. | 348/222.1 |
| 2003/0164886 | A1 * | 9/2003 | Chen | 348/272 |
| 2004/0080639 | A1 * | 4/2004 | Ishiga | 348/272 |
| 2004/0169749 | A1 | 9/2004 | Acharya | |
| 2005/0058361 | A1 * | 3/2005 | Tajima | 382/254 |
| 2005/0088550 | A1 * | 4/2005 | Mitsunaga et al. | 348/272 |
| 2005/0094007 | A1 * | 5/2005 | Nomura et al. | 348/272 |
| 2007/0002154 | A1 * | 1/2007 | Kang et al. | 348/272 |

FOREIGN PATENT DOCUMENTS

| EP | 1 246 475 | 10/2002 |
|---|---|---|
| EP | 1 367 837 | 12/2003 |
| JP | 2002-010279 | 1/2002 |
| JP | 2002-016930 | 1/2002 |
| JP | 3787927 | 4/2006 |
| JP | 2006-186965 | 7/2006 |
| JP | 4011861 | 9/2007 |

OTHER PUBLICATIONS

Japanese Office Action dated Dec. 20, 2011 in related application No. 2007-098996 (6 pages).
European Search Report, dated Nov. 7, 2011, in corresponding European Patent Application No. 08251262.5 (3 pages).

* cited by examiner

*Primary Examiner* — Li Liu
(74) *Attorney, Agent, or Firm* — Finnegan, Henderson, Farabow, Garrett & Dunner, L.L.P.

(57) ABSTRACT

An image processing device includes: an interpolation unit configured to perform interpolation along each of a plurality of directions in a neighbor region of a predetermined pixel of interest in an input image, and generate interpolation values for each; a chroma signal alias intensity calculating unit configured to calculate alias intensities of chroma signals from interpolation values of each of the plurality of directions from the interpolation unit; and a direction evaluation unit configured to generate evaluation values corresponding to each of the plurality of directions, based on the alias intensity of each of the chroma signals of the plurality of directions from the chroma signal alias intensity calculating unit.

12 Claims, 19 Drawing Sheets

FIG. 3

| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |

FIG. 21A

| R | G | R | G | R | G |
|---|---|---|---|---|---|
| G | B | G | E | G | B |
| R | G | R | G | R | G |
| G | E | G | B | G | E |
| R | G | R | G | R | G |
| G | B | G | E | G | B |

FIG. 21B

| C2 | C1 | C2 | C1 | C2 | C1 |
|----|----|----|----|----|----|
| C1 | C3 | C1 | C4 | C1 | C3 |
| C2 | C1 | C2 | C1 | C2 | C1 |
| C1 | C4 | C1 | C3 | C1 | C4 |
| C2 | C1 | C2 | C1 | C2 | C1 |
| C1 | C3 | C1 | C4 | C1 | C3 |

IMAGE PROCESSING DEVICE FOR PERFORMING INTERPOLATION

CROSS REFERENCES TO RELATED APPLICATIONS

The present invention contains subject matter related to Japanese Patent Application JP 2007-098996 filed in the Japanese Patent Office on Apr. 5, 2007, the entire contents of which are incorporated herein by reference.

BACKGROUND OF THE INVENTION

1. Field of the Invention

The present invention relates to an image processing device, and particularly to an image processing device for performing demosaicing processing of a mosaic image, and to a processing method thereof and a program for causing a computer to execute the same.

2. Description of the Related Art

Solid-state imaging devices such as CCD Charge Coupled Device) image sensors and CMOS (Complementary Metal Oxide Semiconductor) image sensors are normally configured with photoreceptors arrayed in a grid, with electric charges occurring due to photoelectric conversion at each photoreceptor being sequentially read out. Since a normal photoreceptor has a singular spectral property, the color of image signals acquired from a solid-state imaging device is that of one channel (i.e., monochromatic). To obtain color images (e.g., tri-channel images such as RGB) with a single solid-state imaging device, a solid-state imaging device is employed which has filters with differing spectral properties (colors) for each photoreceptor. An imaging apparatus using one such color solid-state imaging device is often called a single-sensor apparatus or single-chip apparatus. Since a single-channel image is obtained from the color solid-state imaging device, each pixel only acquires color of the filter of the corresponding photoreceptor, and consequently, an image which is mosaic-like image with regard to color is obtained. Due to this reason, an output image of such a color solid-state imaging device is called a mosaic image.

In order to obtain a multi-channel image from a color imaging device, there is the need to interpolate between the color information of each pixel of the mosaic image according to the surrounding pixel positions, using appropriate image processing. Such image processing is generally called demosaicing processing, color interpolation processing, synchronization, and so forth.

As can be understood from the above description, demosaicing processing is indispensable for single-sensor color imaging apparatuses using a color solid-state imaging device, and various techniques have been developed over the years.

An issue in demosaicing processing is that the sampling frequency and phase of each color of the color filter is different, affecting the image quality in many ways. With the primary-color Bayer array (hereafter, referred to simply as "Bayer array") which is the most commonly-used color array today, color filters of the three primaries of R (Red), G (Green), and B (Blue) are used, with G being arrayed in a checkerboard pattern and R and B in line-sequence. With a Bayer array, G signals are present in all phases, both horizontal and vertical, but R and B are in line-sequence and accordingly signals corresponding to these only exist every other line in the horizontal or vertical direction. That is to say, the sampling frequency of R and B is half of the sampling frequency of G, so the limit of reproducible image signal frequency is also ½ for R and B as compared with G.

Accordingly, in the event that high-frequency components are present in the image signals, a phenomenon can occur wherein the G component of the high-frequency components can be correctly reconstructed but deterioration in amplitude and aliasing occur in the R component and B component, observed as offset in color balance in the output image. This phenomenon is known as false color (color moiré). Moreover, while the sampling frequencies of R and B are the same, the sampling phases differ. Accordingly, the color offset due to aliasing differ between R and G on the image, even further intensifying the false color phenomenon of R and B.

Various attempts have been made in conventional mosaic processing to reduce this false color phenomenon which deteriorates the image quality of output images. For example, interpolation processing has been proposed wherein the correlation as to neighbor pixels is detected for each pixel, and the interpolation method is switched corresponding to the correlation (e.g., see Japanese Unexamined Patent Application Publication No. 10-150668 (FIG. 1)). With this related art, following calculation of the degree of correlation in the vertical, horizontal, and diagonal directions, the direction in which the degree of correlation is the greatest is interpolated, thereby suppressing deterioration in resolution in the orthogonal direction thereof, and reducing occurrence of false color.

Also, with the above-described related art. The interpolation direction can be determined in the wrong direction near the Nyquist frequency, and accordingly a technique has been proposed wherein color saturation is calculated from color difference signals obtained by performing interpolation processing in either the horizontal or vertical direction by correlation determination, comparison is made with color saturation calculated from color difference signals obtained by performing interpolation processing without performing direction selection, and the color difference signals with the smaller color saturation (i.e., the one which can be though to have less occurrence of false color) is selected (e.g., see Japanese Unexamined Patent Application Publication No. 2002-300590 (FIG. 1)). Accordingly, occurrence of false color is reduced by performing interpolation without performing direction selection in a case of erroneous judgment in the correlation determination near the Nyquist frequency.

SUMMARY OF THE INVENTION

However, with the above-described related art, occurrence of false color can be reduced with images including high-frequency components with low color saturation, such as a stripe pattern of white and black, for example, but with cases of images with high-frequency components with high color saturation, such as a colored stripe pattern, color saturation is not reduced even if interpolated in the correct direction, and determination cannot be made between false color and the correct color, leading to the problem of allowing false color to occur.

There has been recognized the need, in demosaicing processing in which the channels of a mosaic output image from a single-sensor color solid-state imaging device are synchronized, to enable occurrence of false color to be reduced in images having high-frequency components with high color saturation such as a colored stripe pattern.

According to an embodiment of the present invention, an image processing device includes: an interpolation unit configured to perform interpolation along each of a plurality of directions in a neighbor region of a predetermined pixel of interest in an input image, and generate interpolation values for each; a chroma signal alias intensity calculating unit configured to calculate alias intensities of chroma signals from interpolation values of each of the plurality of directions from the interpolation unit; and a direction evaluation unit configured to generate evaluation values corresponding to each of the plurality of directions, based on the alias intensity of each of the chroma signals of the plurality of directions from the chroma signal alias intensity calculating unit. This acts so that the interpolation values of multiple directions are evaluated based on the alias intensity of chroma signals.

The chroma signal alias intensity calculating unit may calculate the alias intensity based on statistics of chroma signals of the interpolation values of each of the plurality of directions. In this case, the chroma signal alias intensity calculating unit may include: weighting calculating unit configured to calculate weighting corresponding to each component of the interpolation values of each of the plurality of directions; and statistic calculating unit configured to calculate the statistics from the interpolation values of each of the plurality of directions, in accordance with the weighting. Also, the weighting unit may calculate the degree-of-similarity between components corresponding to the predetermined pixel-of-interest in the interpolation values of each of the plurality of directions, and other components, as the weighting. Also, the chroma signal alias intensity calculating unit may calculate the variance of the chroma signals as the statistics of chroma signals.

Also, the interpolation unit may include: a smoothing unit configured to perform smoothing along a plurality of directions in the neighbor region and generating smoothing values; and an interpolation value generating unit configured to generate the interpolation values based on the smoothing values. This acts so that interpolation processing can be performed at higher speeds by performing smoothing along the interpolation direction instead of performing interpolation for each pixel.

Also, the direction evaluation unit may compare the relation in magnitude of the alias intensities of chroma signals for each of the plurality of directions, and set the evaluation value of the direction with the smallest alias intensity so as to be higher than a predetermined value, and set the evaluation values of the remaining directions so as to be lower than the predetermined value. On the other hand, the direction evaluation unit may determine the evaluation values of the plurality of directions, in accordance with the ratio of the alias intensities of chroma signals for each of the plurality of directions.

Also, the plurality of directions may be a combination of two or more of the horizontal direction, vertical direction, lower-left-to-upper-right direction, and upper-left-to-lower-right direction. Note that in embodiments of the present invention, description will be made regarding an example of combining the horizontal direction and vertical direction.

Also, according to an embodiment of the present invention, an image processing device includes: a first interpolation unit configured to perform interpolation along each of a plurality of directions in a neighbor region of a predetermined pixel of interest in an input image, and generate first interpolation values for each; a chroma signal alias intensity calculating unit configured to calculate alias intensities of chroma signals from first interpolation values of each of the plurality of directions from the first interpolation unit; a direction evaluation unit configured to generate evaluation values corresponding to each of the plurality of directions, based on the alias intensity of each of the chroma signals of the plurality of directions from the chroma signal alias intensity calculating unit; a second interpolation unit configured to perform interpolation along the plurality of directions and take the interpolation values of each as second interpolation values; and a synthesizing unit for synthesizing the second interpolation values of directions corresponding to evaluation values as to each of the plurality of directions. This acts so that interpolation values of multiple directions are synthesized based on the alias intensity of the chroma signals.

Also, according to an embodiment of the present invention, an image processing device includes: an interpolation unit configured to perform interpolation along each of a plurality of directions in a neighbor region of a predetermined pixel of interest in an input image, and generate interpolation values for each; a chroma signal alias intensity calculating unit configured to calculate alias intensities of chroma signals from interpolation values of each of the plurality of directions from the interpolation unit; a direction evaluation unit configured to generate evaluation values corresponding to each of the plurality of directions, based on the alias intensity of each of the chroma signals of the plurality of directions from the chroma signal alias intensity calculating unit; and a synthesizing unit for synthesizing the interpolation values of directions corresponding to evaluation values as to each of the plurality of directions. This acts so that interpolation values used for synthesizing and interpolation values for directional determination as shared.

Also, according to an embodiment of the present invention, an image processing device includes: an imaging unit configured to image a subject and generate an input image; an interpolation unit configured to perform interpolation along each of a plurality of directions in a neighbor region of a predetermined pixel of interest in an input image, and generate interpolation values for each; a chroma signal alias intensity calculating unit configured to calculate alias intensities of chroma signals from interpolation values of each of the plurality of directions from the interpolation unit; and a direction evaluation unit configured to generate evaluation values corresponding to each of the plurality of directions, based on the alias intensity of each of the chroma signals of the plurality of directions from the chroma signal alias intensity calculating unit. This acts so that interpolation values of multiple directions are evaluated based on the alias intensity of chroma signals of the imaged image.

Also, the imaging unit may be an image sensor with a primary-color Bayer array color filter disposed on the front face. Also, the imaging unit may be an image sensor with a color filter disposed on the front face; the color filter having pixels corresponding to a particular color disposed in a checkerboard pattern, with at least three remaining colors disposed in the remaining pixel positions. Also, in this case, the particular color may be a filter color having spectral sensitivity close to that of the human visibility curve. Also, of the at least three colors, a first color may be disposed in a square-grid pattern of every other pixel in the horizontal direction and vertical direction at pixel positions other than the particular color, with second and third colors being disposed in a diagonal grid every other pixel in the diagonal direction at remaining pixel positions. In this case, the first color may be a filter color having spectral properties with sensitivity at the long-wavelength side as compared with the particular color; with at least one of the second and third colors being a filter color having spectral properties with sensitivity at the short-wavelength side as compared with the particular color. Also, the particular color may be a filter color having spectral sensitivity to infrared rays as well.

Also, according to an embodiment of the present invention, an image processing method includes the steps of: performing interpolation along each of a plurality of directions in a neighbor region of a predetermined pixel of interest in an input image, and generating interpolation values for each;

calculating alias intensities of chroma signals from interpolation values of each of the plurality of directions; and generating evaluation values corresponding to each of the plurality of directions, based on the alias intensity of each of the chroma signals of the plurality of directions. Also provided is a program for causing a computer to execute these. This acts so that interpolation values of multiple directions are evaluated based on the alias intensity of chroma signals.

According to embodiments of the present invention, excellent advantages can be had in that occurrence of false color can be reduced in images including high-frequency components with high color saturation as well.

BRIEF DESCRIPTION OF THE DRAWINGS

FIG. 3 is a diagram illustrating a Bayer array as an example of a color filter disposed to the front face of an imaging device according to an embodiment of the present invention;

FIGS. 21A and 21B are diagrams illustrating an example of another color filter disposed to the front face of an imaging device according to an embodiment of the present invention.

DESCRIPTION OF THE PREFERRED EMBODIMENTS

Figure 1:
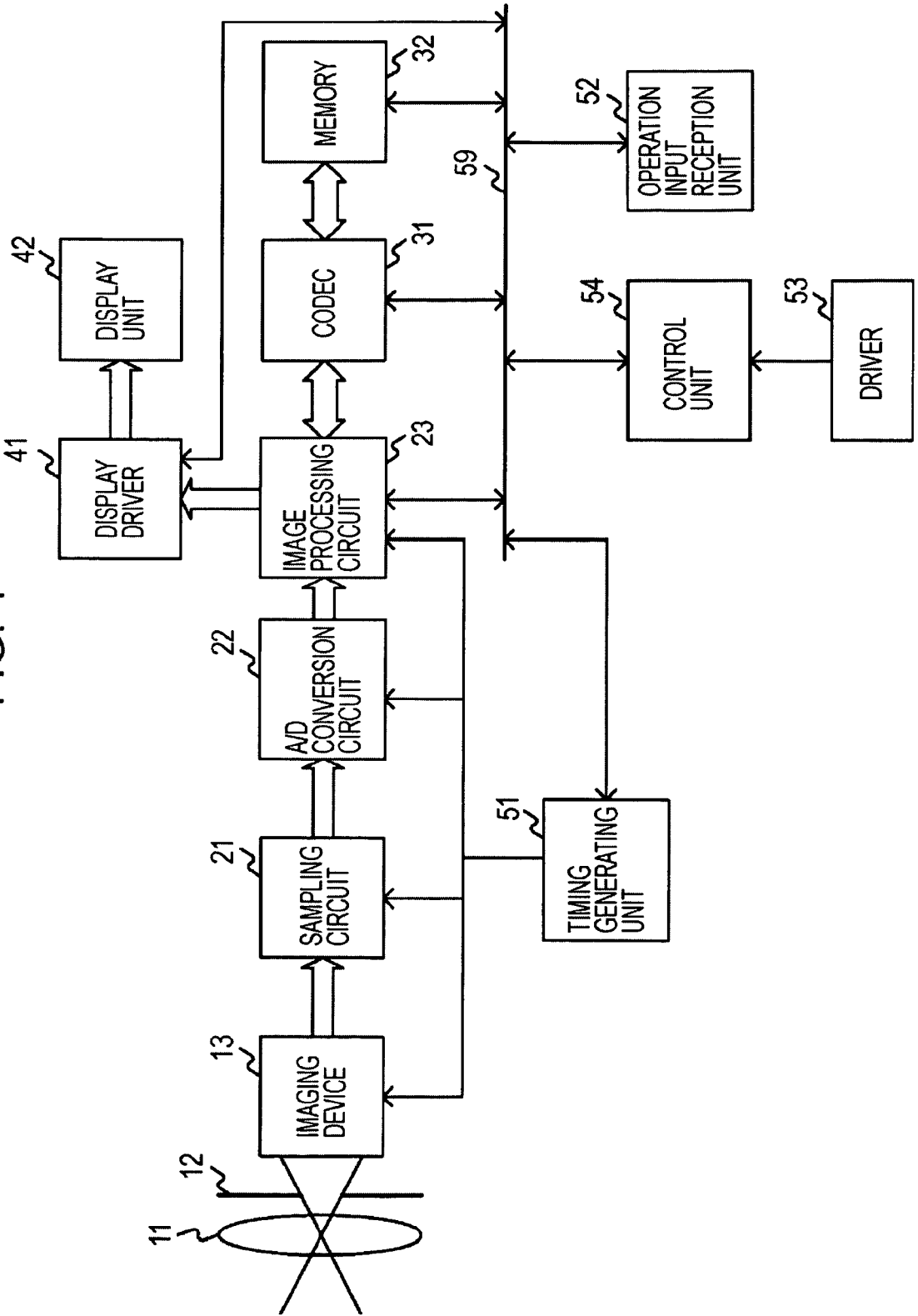
FIG. 1 is a diagram illustrating an example of an imaging apparatus according to an embodiment of the present invention.

Embodiments of the present invention will be described in detail with reference to the drawings. FIG. 1 is a diagram illustrating an example of an imaging apparatus according to an embodiment of the present invention. The imaging apparatus is generally configured of an optical system, signal processing system, recording system, display system, and control system.

The optical system is configured of a lens 11 for converging a light image of a subject, an aperture 12 for adjusting the quantity of light of the light image, and an imaging device 13 for converting the converged light image into electrical signals by photoelectrical conversion. The imaging device 13 is realized by way of, for example, a CCD image sensor, CMOS image sensor, or the like.

The signal processing system is configured of a sampling circuit 21 for sampling electrical signals from the imaging device 13, an A/D conversion circuit 22 for converting analog signal supplied from the sampling circuit 21 into digital signals, and an image processing circuit 23 for subjecting the digital signals input from the A/D conversion circuit 22 to predetermined image processing. The sampling circuit 21 is realized by a CDS (Correlated Double Sampling) circuit, for example. Thus, noise occurring at the imaging device 13 is alleviated. Also, the image processing circuit 23 is realized by a DSP (Digital Signal Processor), for example. Details of processing executed by the image processing circuit 23 will be described later.

The recording system is configured of memory 32 for recording image signals, and a codec 31 for encoding image signals processed by the image processing circuit 23 and recording these in the memory 32, and also reading out image signals from the memory 32 and decoding these to be supplied to the image processing circuit 23. The memory 32 may be a magnetic disk, optical disc, magneto-optical disk, semiconductor memory, or the like.

The display system is configured of a display driver 41 for outputting image signals processed at the image processing circuit 23 to a display unit 42, and a display unit 42 for displaying images corresponding to input image signals. The display unit 42 is realized by an LCD (Liquid Crystal Display) or the like for example, and also functions as a viewfinder.

The control system is configured of a timing generator 51 for controlling the operating timing of the imaging device 13, sampling circuit 21, A/D conversion circuit 22, and image processing circuit 23, an operation input reception unit 52 for receiving shutter operations and other command input form the user, a driver 53 for connecting to peripheral devices, and a control unit 54 for controlling the overall imaging apparatus. Connected to the driver 53 is a magnetic disk, optical disc, magneto-optical disk, semiconductor memory, or the like. The control unit 54 reads out a control program stored in these via the driver 53, and executes control based on the control program that has been read out and commands and the like from the user input from the operation input reception unit 52, and so forth.

The image processing circuit 23, codec 31, memory 32, display device 41, timing generator 51, operation input reception unit 52, and control unit 54 are mutually connected by way of a bus 59.

With this imaging apparatus, a light image of a subject (incident light) is input to the imaging device 13 via the lens 11 and aperture 12, and is subjected to photoelectric conversion into electrical signals by the imaging device 13. The obtained electrical signals are subjected to removal of noise component by the sampling circuit 21, a d digitized by the A/D conversion circuit 22, and then temporarily stored in image memory (not shown) built into the image processing circuit 23.

Note that in a normal state, the image memory built into the image processing circuit 23 constantly has image signals overwritten at a constant frame rate, by control performed by the timing generator 51 on the signal processing system. Image signals in the image memory built into the image processing circuit 23 are output to the display unit 42 via the display driver 41, and a corresponding image is displayed on the display unit 42.

The display unit 42 also serves as the viewfinder of the imaging apparatus. In the event that the user presses a shutter button included in the operation input reception unit 52, the control unit 54 controls the timing generator 51 to holds image signals immediately following the shutter button being pressed, i.e., controls the signal processing system such that the such that image signals are not overwritten on the image memory of the image processing circuit 23. The image data held in the image memory of the image processing circuit 23 is encoded by the codec 31 and recorded in the memory 32. Thus, acquisition of one picture of image data is completed, by these operations of the imaging apparatus.

Figure 2:
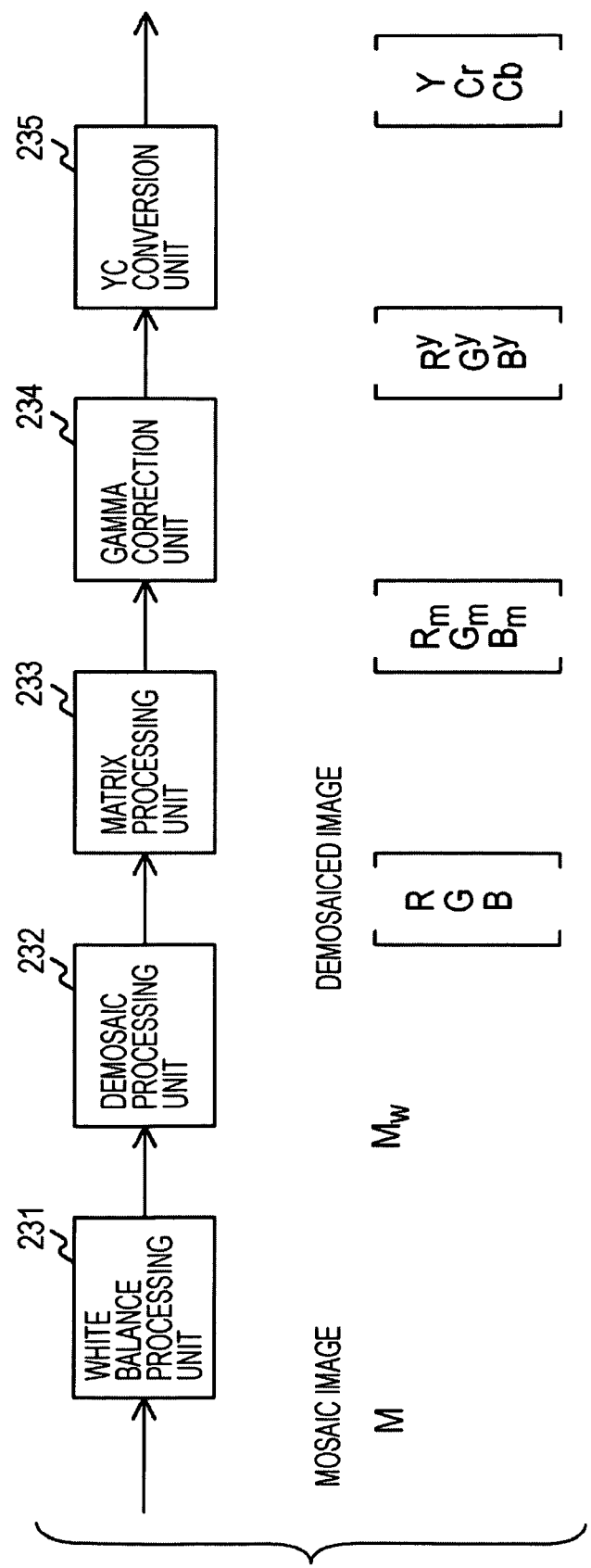
FIG. 2 is a diagram illustrating an example of processing functions of an image processing circuit 23 according to an embodiment of the present invention.

FIG. 2 is a diagram illustrating an example of the processing functions of the image processing circuit 23 according to an embodiment of the present invention. The image processing circuit 23 includes a white balance processing unit 231, a demosaic processing unit 232, a matrix processing unit 233, a gamma correction unit 234, and a YC conversion unit 235. This image processing circuit 23 is for taking a mosaic image M digitized by the A/D conversion circuit 22 as an input image, and performing image processing. A mosaic image stores intensity signals corresponding to one of the colors R, G, B for pixels, with the color array thereof being a Bayer array such as shown in FIG. 3.

The white balance processing unit 231 subjects the mosaic image M to white balance processing. The white balance processing unit 231 applies appropriate coefficients according to the colors of the pixel intensities of the mosaic image M, such that the color balance of an achromatic subject region is achromatic. A mosaic image $M_W$ subjected to white balance processing is supplied to the demosaic processing unit 232.

The demosaic processing unit 232 performs interpolation processing (demosaicing processing) such that the intensities of all channels of R, G, and B, are present at all pixel positions of the mosaic image $M_W$. A demosaiced image $[R, G, B]^T$ which has been subjected to this interpolation processing is supplied to the matrix processing unit 233. Note that a matrix $A^T$ means a transposed matrix of a matrix A.

The matrix processing unit 233 applies a 3-by-3 linear matrix with coefficients set beforehand to each of the pixels $[R, G, B]^T$ output from the demosaic processing unit 232, and performs conversion into a three-primary-color intensity value $[R_m, G_m, B_m]^T$. A linear matrix is conversion coefficients for color reproduction closer to human perception. The intensity value $[R_m, G_m, B_m]$ T following conversion is supplied to the gamma correction unit 234.

The gamma correction unit 234 subjects the intensity value $[R_m, G_m, B_m]^T$ to gamma correction. Gamma correction is correction for reproducing the input image on the display unit 42 as a display true to the input image. The output $[R\gamma, G\gamma, B\gamma]^T$ of the gamma correction unit 234 is supplied to the YC conversion unit 235.

The YC conversion unit 235 subjects the gamma-corrected three-channel image $[R\gamma, G\gamma, B\gamma]^T$ to matrix processing and chroma component band limiting, thereby outputting brightness signal (Y) and color-difference signals (Cr, Cb). The brightness signal and color-difference signals are supplied to the codec 31 downstream from the image processing circuit 23.

Note that the display driver 41 is usually supplied with RGB signals. RGB signals are the brightness signals and color-difference signals which are the output of the YC conversion unit 235 that have been converted into RGB signals.

FIG. 3 is a diagram illustrating a Bayer array as an example of a color filter disposed on the front face of an imaging device according to an embodiment of the present invention. With this Bayer array, G color pixels are disposed in checkerboard fashion, with R color pixels being disposed in a square-grid pattern of every other pixel in the horizontal direction and vertical direction at other pixel positions, and B color pixels being disposed in a square-grid pattern of every other pixel in the horizontal direction and vertical direction at remaining pixel positions.

The G color is a filter color of spectral properties close to the human visibility curve. The R color is a filter color of spectral properties having sensitivity toward the relatively long wavelength side. On the other hand, the B color is a filter color of spectral properties having sensitivity toward the relatively short wavelength side.

These can be sectioned into a first channel (G) disposed in checkerboard fashion, and a second channel (R and B) which is the rest. With the first channel, the color exists regarding which direction smoothing is performed, either the horizontal direction or vertical direction. In the other hand, with the second channel, in the event of smoothing in one of the horizontal direction or vertical direction, there may be cases where that color does not exist. In this case, the intensity of the second channel can be estimated using the intensity of the first channel.

Figure 4:
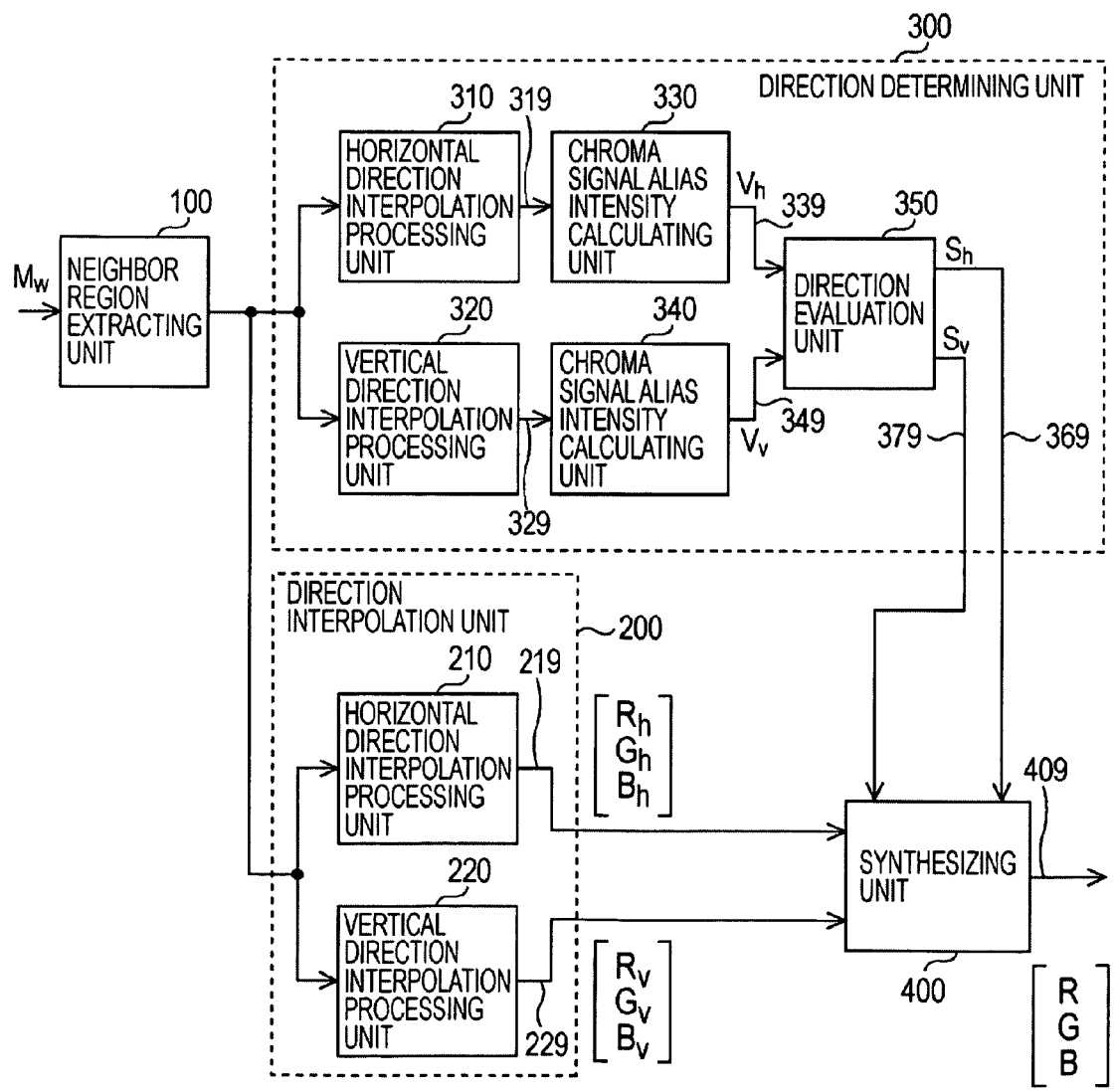
FIG. 4 is a diagram illustrating a functional configuration example of a demosaicing processing unit 232 according to an embodiment of the present invention.

FIG. 4 is a diagram illustrating a functional configuration example of a demosaicing processing unit 232 according to an embodiment of the present invention. The demosaicing processing unit 232 has a neighbor region extracting unit 100, a direction interpolation unit 200, a direction determining unit 300, and a synthesizing unit 400. Demosaicing processing is processing for sequentially interpolating or estimating the intensity of color that does not exist at each color position, so that all colors exist at all pixel positions. That is to say, the processes to be described next are processes which are performed a pixel-of-interest positions which are sequentially set, and which end after being repeated for all pixels.

The neighbor region extracting unit 100 is for extracting a neighbor region of a predetermined size around a pixel-of-interest position, from the mosaic image $M_W$ which has been subjected to white balance processing. With the embodiment according to the present invention, we will say that a rectangular region of 9×9 pixels centered on a pixel-of-interest position is extracted as a neighbor region.

For example, in the event of realizing the neighbor region extracting unit 100 as software, an operation should be performed so as to secure pixel values within the rectangular region of 9×9 pixels neighboring the pixel-of-interest position within memory in the form of an array. Also, in the event of realizing the neighbor region extracting unit 100 as hardware, normal imaging apparatus signal processing systems often change signals from the image sensor into data in the form of a one-dimensional system of horizontal line pixel intensities, so in such a case, an arrangement can be made wherein delay lines capable of holding pixel intensities for one line worth are used so as to ensure access to pixels in horizontal lines adjacent above and below. Preparing at least eight delay lines is sufficient to secure access to the rectangular region of 9×9 pixels.

The direction interpolation unit 200 is for performing interpolation processing along each of multiple directions regarding the pixel-of-interest position, and outputting interpolation results in each of the multiple directions. With the embodiment of the present invention, the direction interpolation unit 200 has a horizontal direction interpolation processing unit 210 for performing interpolation processing along the horizontal direction, and a vertical direction interpolation processing unit 220 for performing interpolation processing along the vertical direction. The horizontal direction interpolation processing unit 210 outputs horizontal direction interpolation values $[R_h, G_h, B_h]^T$ to a signal line 219, and the vertical direction interpolation processing unit 220 outputs vertical direction interpolation values $[R_v, G_v, B_v]^T$ to a signal line 229.

The direction determining unit 300 determines texture direction for the pixel-of-interest position, and instructs how to synthesize interpolation values along the multiple directions. With the embodiment of the present invention, the direction determining unit 300 calculates the weights $S_h$ and $S_v$ of the interpolation values in the horizontal direction and vertical direction. The direction determining unit 300 has a horizontal direction interpolation processing unit 310 for performing interpolation processing along the horizontal direction, and vertical direction interpolation processing unit 320 for performing interpolation processing along the vertical direction. Interpolation values output from the horizontal direction interpolation processing unit 310 and vertical direction interpolation processing unit 320 via signal lines 319 and 329 are input to chroma signal alias intensity calculating units 330 and 340, respectively. The chroma signal alias intensity calculating units 330 and 340 are for calculating the alias intensity of chroma signals included in interpolation values. The horizontal direction alias intensity $V_h$ and vertical direction alias intensity $V_v$ output from the chroma signal alias intensity calculating units 330 and 340 via signal lines 339 and 349 are supplied to a direction evaluation unit 350.

The direction evaluation unit 350 calculates the weights $S_h$ and $S_v$ of the interpolation values in the horizontal direction and vertical direction, based on the horizontal-direction and vertical-direction alias intensities $V_h$ and $V_v$. The weights $S_h$ and $S_v$ of the interpolation values in the horizontal direction and vertical direction, calculated by the direction evaluation unit 350, are output via signal lines 369 and 379. For example, in the event that the horizontal direction alias intensity $V_h$ is smaller than the vertical direction alias intensity $V_v$, the horizontal direction interpolation value weight $S_h$ is set to "1", and the vertical direction interpolation value weight $S_v$ is set to "0". On the other hand, otherwise, the horizontal direction interpolation value weight $S_h$ is set to "0", and the vertical direction interpolation value weight $S_v$ is set to "1". Also, as another calculation method, the weights $S_h$ and $S_v$ may be calculated according to the following expressions from the ratio of alias intensity.

$$S_h = 1 - V_h/(V_h + V_v) \qquad \text{Equation 1:}$$

$$S_v = 1 - V_v/(V_h + V_v) \qquad \text{Equation 2:}$$

The synthesizing unit 400 is for synthesizing the interpolation values output by the direction interpolation unit 200, based on the interpolation value weights $S_h$ and $S_v$ output by the direction determining unit 300. The synthesizing unit 400 calculates the mosaic image $[R, G, B]^T$ by the following expression for example, and outputs this to a signal line 409.

$$\begin{bmatrix} R \\ G \\ B \end{bmatrix} = S_h \begin{bmatrix} R_h \\ G_h \\ B_h \end{bmatrix} + S_v \begin{bmatrix} R_v \\ G_v \\ B_v \end{bmatrix}$$

Thus, in the event that the texture direction is a vertical direction as with vertical stripes for example, synthesizing can be performed with weight on interpolation values in the vertical direction, and in the event that the texture direction is a horizontal direction as with horizontal stripes for example, synthesizing can be performed with weight on interpolation values in the horizontal direction.

Figure 5:
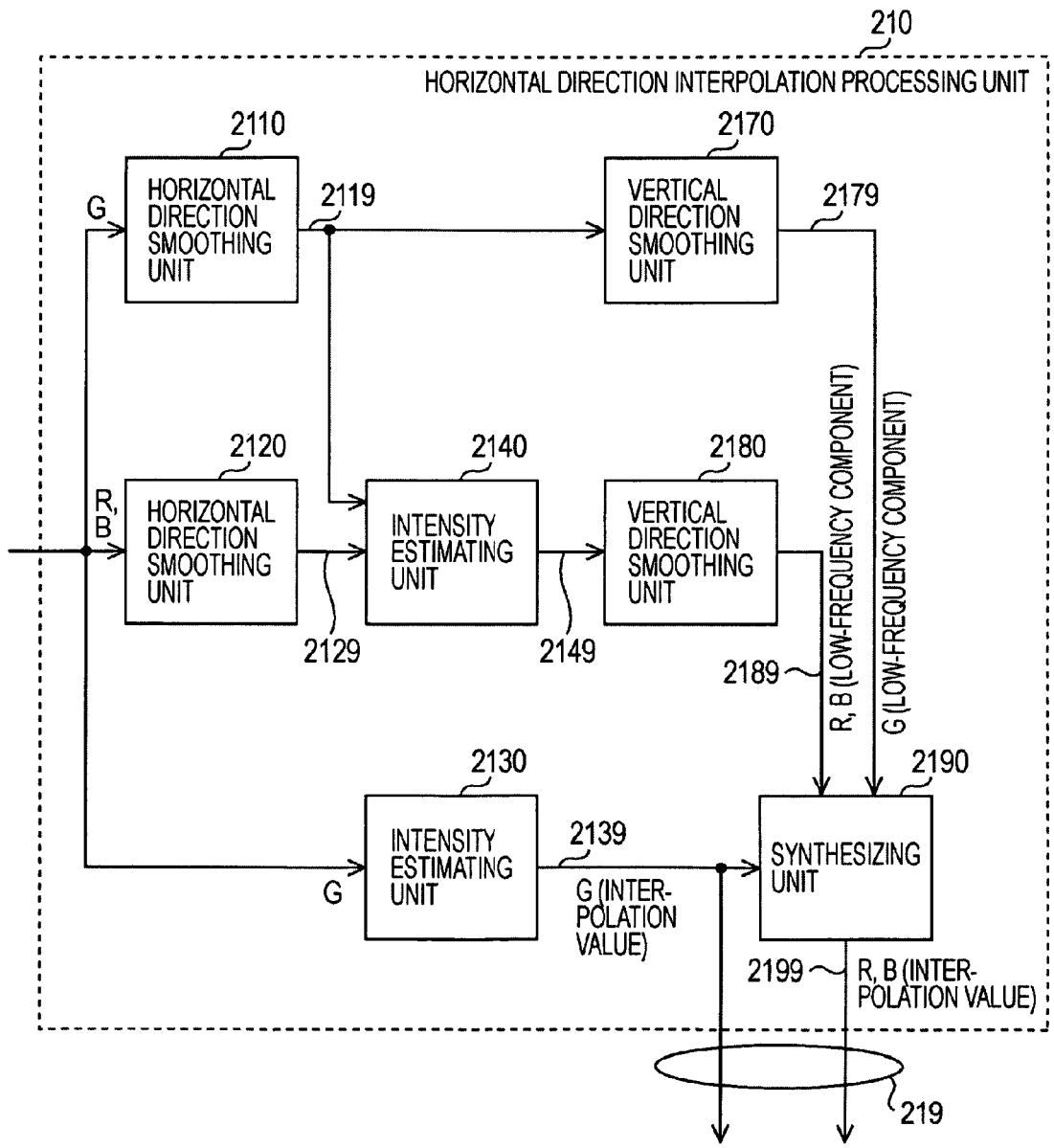
FIG. 5 is a diagram illustrating a functional configuration example of a horizontal direction interpolation processing unit 210 according to an embodiment of the present invention.

FIG. 5 is a diagram illustrating a functional configuration example of the horizontal direction interpolation processing unit 210 according to the embodiment of the present invention. The horizontal direction interpolation processing unit 210 includes horizontal direction smoothing units 2110 and 2120, intensity estimating units 2130 and 2140, vertical direction smoothing units 2170 and 2180, and a synthesizing unit 2190.

The horizontal direction smoothing unit 2110 is for performing smoothing in the horizontal direction at positions following the vertical direction (hereafter called vertical sample positions) for the G channel of the RGB channels included in the neighbor region of the pixel-of-interest position. Smoothing values generated by the horizontal direction smoothing unit 2110 are output to a signal line 2119.

The horizontal direction smoothing unit 2120 is for performing smoothing in the horizontal direction at vertical sample positions for the R channel and B channel of the RGB channels included in the neighbor region of the pixel-of-interest position. Note that with the R channel and B channel, there are cases wherein there are no pixels of the relevant channel on a horizontal line of a given vertical sample position, so in such a case a smoothing value cannot be obtained, and the smoothing value remains non-existent. Smoothing values generated by the horizontal direction smoothing unit 2120 are output to a signal line 2129.

The intensity estimating unit 2130 is for performing estimation of the intensity of the pixel-of-interest position, for the G channel of the RGB channels included in the neighbor region of the pixel-of-interest position. In the event that a G channel pixel exists at the pixel-of-interest position, the intensity estimating unit 2130 takes that value as the intensity, and in the event that a G channel pixel does not exist at the pixel-of-interest position, the intensity estimating unit 2130 estimates the average value of the pixel intensities of G channel pixels neighboring in the horizontal direction as the intensity. The estimated intensity is output to a signal line 2139 as a G channel interpolation value.

The intensity estimating unit 2140 is for performing estimation of the intensity of the smoothing values of the R channel and B channel from the horizontal direction smoothing unit 2120 by the intensity of the G channel smoothing value from the horizontal direction smoothing unit 2110. The intensity estimated by the intensity estimating unit 2140 is output to a signal line 2149 as an interpolated smoothing value of the R channel and B channel.

The vertical direction smoothing unit 2170 is for further smoothing, in the vertical direction, the intensity of the horizontal direction smoothing value of the G channel from the horizontal direction smoothing unit 2110. The value thus generated is output to a signal line 2179 as a low-frequency component of the G channel.

The vertical direction smoothing unit 2180 is for further smoothing, in the vertical direction, the intensity of the horizontal direction smoothing value of the R channel and B channel that has been interpolated, from the intensity estimating unit 2140. The value thus generated is output to a signal line 2179 as a low-frequency component of the R channel and B channel.

The synthesizing unit 2190 is for synthesizing the intensities of the R channel and B channel of the pixel-of-interest position, based on the low-frequency component of the G channel from the vertical direction smoothing unit 2170, the low-frequency component of the R channel and B channel from the vertical direction smoothing unit 2180, and the G channel interpolation value from the intensity estimating unit 2130. Now, taking the R channel as an example of a channel to be synthesized, the intensity $R_C$ of the R channel is a synthesized value of the high-frequency component $R_H$ and low-frequency component $R_L$ of the R channel. Also, the R channel high-frequency component $R_H$ can be obtained from the ratio of G channel high-frequency component and low-frequency component. Accordingly, the R channel intensity $R_C$ is obtained by multiplying the ratio of the low-frequency components of the R channel and G channel by the G channel intensity $G_C$, as shown in the following expression. This holds true for the B channel as well.

$$R_C = R_H + R_L = R_L \cdot ((G_C - G_L)/G_L) + R_L = (R_L/G_L) \cdot G_C$$

The R channel and B channel intensity synthesized by the synthesizing unit 2190 is output to a signal line 2199 as the R channel and B channel interpolation value. Also, the R channel and B channel interpolation value, and the G channel interpolation value output from the intensity estimating unit 2130, are output to a signal line 219 as interpolation processing results following the horizontal direction.

Note that while description has been made regarding a functional configuration example of the horizontal direction interpolation processing unit 210, the basic configuration of the vertical direction interpolation processing unit 220 is the same, only with the horizontal direction and vertical direction inverted.

Figure 6:
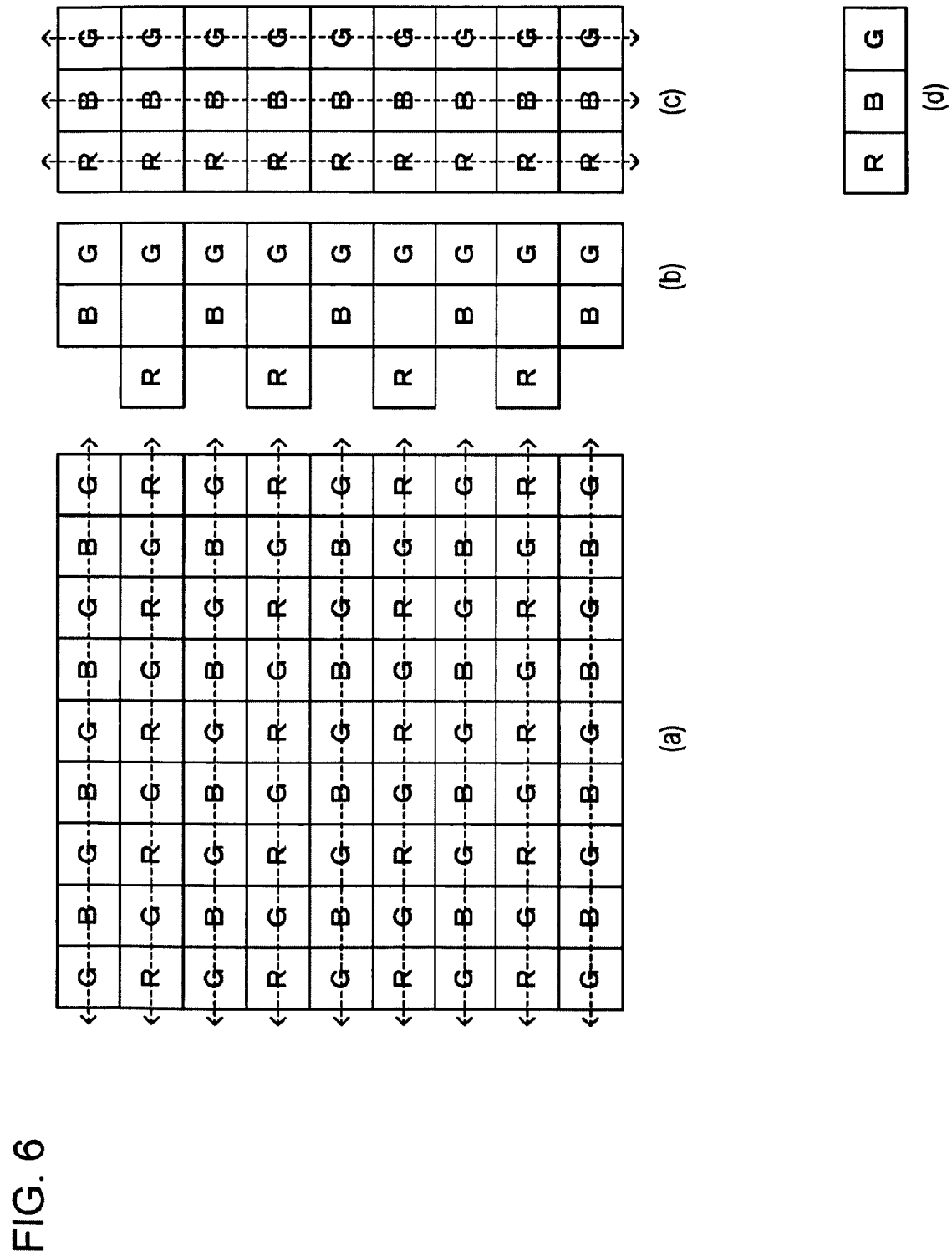
FIG. 6 is a schematic diagram of the processing of the horizontal direction interpolation processing unit 210 according to an embodiment of the present invention.

FIG. 6 is a model diagram of the processing of the horizontal direction interpolation processing unit 210 according to the embodiment of the present invention. In FIG. 6, (a) illustrates the way in which horizontal direction smoothing is performed on a 9×9 pixel Bayer array. Smoothing is performed by the horizontal direction smoothing unit 2110 for the G channel, and smoothing is performed by the horizontal direction smoothing unit 2120 for the R channel and B channel.

In FIG. 6, (b) illustrates the smoothing results with the horizontal direction smoothing units 2110 and 2120. The G channel exists on all lines, so smoothing values are obtained for all vertical sample positions. On the other hand, the R channel and B channel exist every other line, so it can be seen that smoothing values are not obtained for all vertical sample positions, and there are blank places.

The intensity estimating unit 2140 estimates the intensity regarding the R channel and B channel smoothing values, and as shown in (c) in FIG. 6, arranges such that smoothing values are present for all vertical sample positions for the R channel and B channel as well.

In FIG. 6, (c) illustrates the way in which vertical direction smoothing is performed on the obtained horizontal direction smoothing values. Smoothing is performed for the G channel with the vertical direction smoothing unit 2170, and smoothing is performed for the R channel and B channel with the vertical direction smoothing unit 2180.

In FIG. 6, (d) illustrates the smoothing results of the vertical direction smoothing units 2170 and 2180. These smoothing values are the low-frequency components of each channel, and are supplied to the synthesizing unit 2190.

Figure 7:
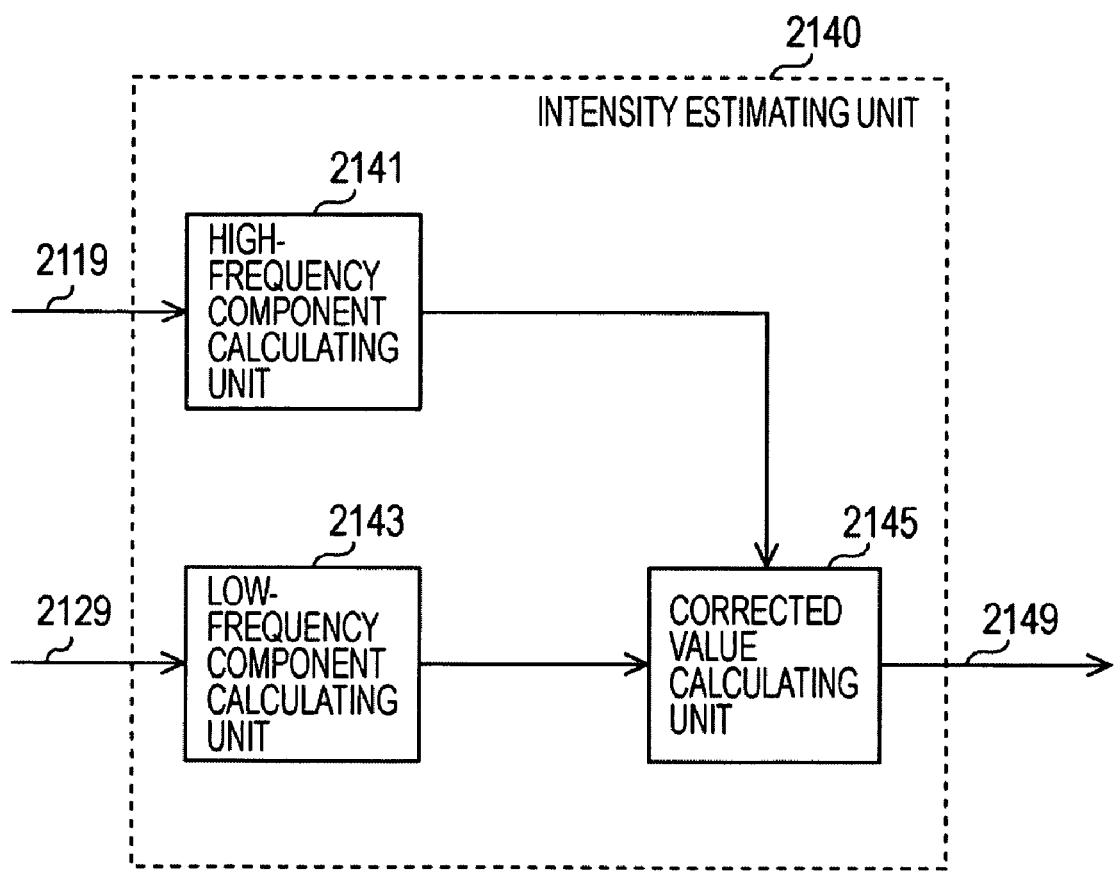
FIG. 7 is a diagram illustrating a functional configuration example of an intensity estimating unit 2140 according to an embodiment of the present invention.

FIG. 7 is a diagram illustrating a functional configuration example of the intensity estimating unit 2140 according to the embodiment of the present invention. The intensity estimating unit 2140 includes a high-frequency component calculating unit 2141, a low-frequency component calculating unit 2143, and a corrected value calculating unit 2145.

The high-frequency component calculating unit 2141 is for calculating the high-frequency component of the smoothing value generated by the horizontal direction smoothing unit 2110 at each vertical sample position. If we say that the vertical sample position being reference is position i, the smoothing value of the G channel at position i is G[i], and the smoothing values of the G channel at adjacent positions to the position i are G[i−1] and G[i+1]. Now, in the event that there is an R channel pixel at position i, the G channel high-frequency component $G_H[i]$ is calculated by $$G_H[i] = ((G[i+1] + G[i-1])/2 - G[i])/2,$$

and in the event that there is no R channel pixel at position i, this is calculated by $$G_H[i] = (G[i] - (G[i+1] + G[i-1])/2)/2.$$

While description has been made here regarding a method for calculating the high-frequency component of the G channel taking the R channel position as a reference, the B channel may be used as a reference instead of the R channel.

The low-frequency component calculating unit 2143 is for calculating the low-frequency component of the smoothing value generated by the horizontal direction smoothing unit 2120 at each vertical sample position. If we say that the vertical sample position being reference is position i, the smoothing value of the R channel at position i is R[i], and the smoothing values of the R channel at adjacent positions to the position i at the vertical sample position are R[i−1] and R[i+1]. Now, in the event that there is an R channel pixel at position i, the R channel low-frequency component $R_L[i]$ is calculated by $$R_L[i] = R[i],$$

and in the event that there is no R channel pixel at position i, this is calculated by $$R_L[i] = (R[i+1] + R[i-1])/2.$$

This is also the same in cases of calculating the B channel low-frequency component $B_L[i]$ as well.

The corrected value calculating unit 2145 is for correcting the smoothing value of the R channel or B channel at each vertical sample position, from the high-frequency component of the G channel generated by the high-frequency component calculating unit 2141 and the R channel or B channel low-frequency component generated by the low-frequency component calculating unit 2143. If we say that the vertical sample position being reference is position i, the R channel corrected value $R_C[i]$ can be calculated by adding the R channel low-frequency component $R_L[i]$ and the G channel high-frequency component $G_H[i]$ with the following expression.

$$R_C[i]=R_L[i]+G_H[i]$$

This holds true for the B channel as well, and the B channel corrected value $B_C[i]$ can be obtained by adding the B channel low-frequency component $B_L[i]$ and the G channel high-frequency component $G_H[i]$.

While description has been made here regarding an example of calculating the R channel corrected value by adding the R channel or B channel low-frequency component to the G channel high-frequency component, the R channel or B channel corrected value may be calculated by estimating the high-frequency component of the R channel or B channel, as described below.

Figure 8:
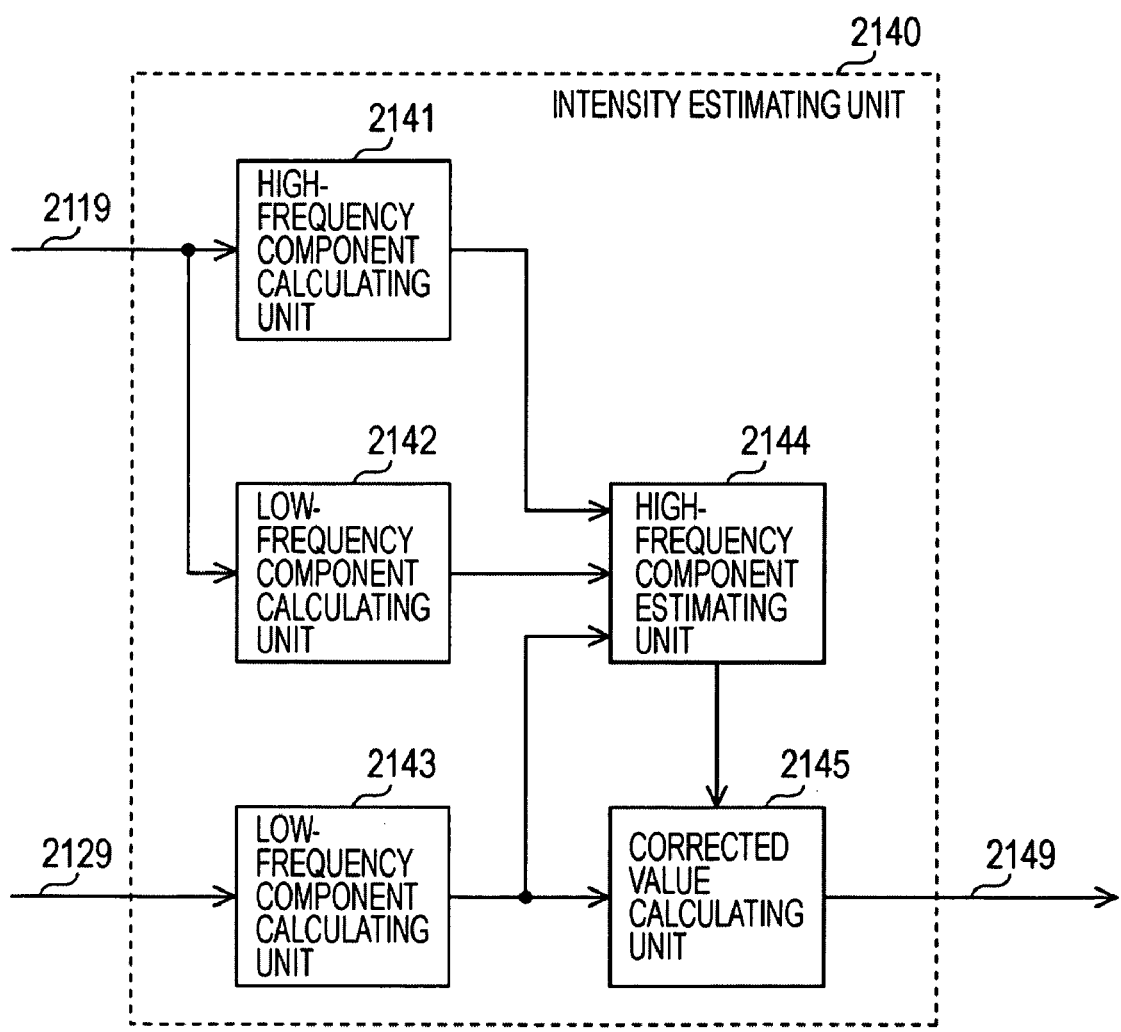
FIG. 8 is a diagram illustrating another functional configuration example of the intensity estimating unit 2140 according to an embodiment of the present invention.

FIG. 8 is a diagram illustrating another functional configuration example of the intensity estimating unit 2140 according to an embodiment of the present invention. This intensity estimating unit 2140 includes a high-frequency component calculating unit 2141, a low-frequency component calculating unit 2142, a low-frequency component calculating unit 2143, a high-frequency component estimating unit 2144, and a corrected value calculating unit 2145. That is to say, this is a configuration wherein the low-frequency component calculating unit 2142 and high-frequency component estimating unit 2144 have been added to the example in FIG. 7.

The low-frequency component calculating unit 2142 is for calculating the low-frequency component of the smoothing value generated by the horizontal direction smoothing unit 2110 at each vertical sample position. If we say that the vertical sample position being referenced is position i, and the G channel smoothing value at position i is G[i], the G channel low-frequency component $G_L[i]$ is calculated by $$G_L[i]=G[i].$$

The high-frequency component estimating unit 2144 is for estimating the R channel or B channel high-frequency component by adjusting the high-frequency component of the G channel generated by the high-frequency component calculating unit 2141, based on the ratio between the low-frequency component of the G channel generated by the low-frequency component calculating unit 2142 and the R channel or B channel low-frequency component generated by the low-frequency component calculating unit 2143. If we say that the vertical sample position being reference is position i, the G channel high-frequency component at the position i is $G_H[i]$, the G channel low-frequency component is $G_L[i]$, and the R channel low-frequency component is $R_L[i]$, the R channel high-frequency component $R_H[i]$ can be calculated from the following expression.

$$R_H[i]=(R_L[i]/G_L[i])\cdot G_H[i]$$

Thus, the corrected value calculating unit 2145 can calculate by adding the R channel low-frequency component $R_L[i]$ and the R channel high-frequency component $R_H[i]$ as shown in the following expression.

$$R_C[i]=R_L[i]+R_H[i]$$

Note that while description has been made regarding the R channel, this holds true for the B channel as well.

Figure 9:
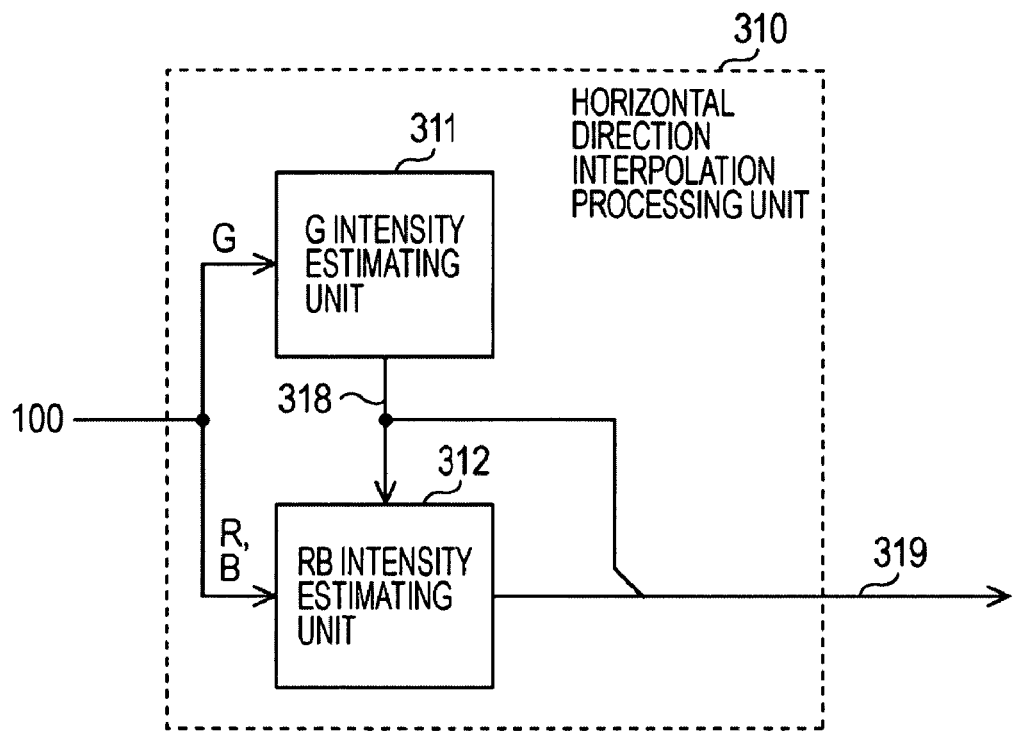
FIG. 9 is a diagram illustrating a functional configuration example of a horizontal direction interpolation processing unit 310 according to an embodiment of the present invention.

FIG. 9 is a diagram illustrating a functional configuration example of the horizontal direction interpolation processing unit 310 according to the embodiment of the present invention. The horizontal direction interpolation processing unit 310 includes a G intensity estimating unit 311 and an RB intensity estimating unit 312.

Figure 10A:
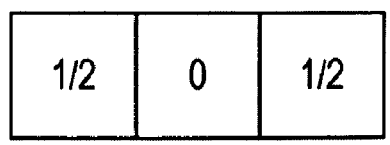
FIGS. 10A and 10B are diagrams illustrating an example of an interpolation filter used with an embodiment of the present invention.
Figure 10B:
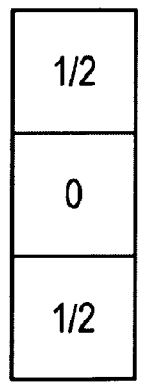

The G intensity estimating unit 311 is for estimating the G channel at a position with no G channel pixel, in the neighbor region extracted by the neighbor region extracting unit 100. As for a method of this estimation, estimation can be made by obtaining the average value of the intensity of the pixels adjacent in the horizontal direction, using the interpolation filter shown in FIG. 10A, for example. The G channel estimation value is output to the signal line 318. Note that the G intensity estimating unit at the vertical direction interpolation processing unit 320 is the same, and estimation can be made by obtaining the average value of the intensity of the pixels adjacent in the vertical direction, using the interpolation filter shown in FIG. 10B, for example.

The RB intensity estimating unit 312 is for estimating the R channel and B channel at a position with no R channel or B channel pixel, in the neighbor region extracted by the neighbor region extracting unit 100. As for a method of this estimation, estimation can be made by obtaining the average value of the intensity of the pixels adjacent in the horizontal direction, using the interpolation filter shown in FIG. 10A, for example. However, there are cases regarding the R channel and B channel that the channel is not present on the line, so in that case, the R channel and B channel intensity can be estimated based on the G channel intensity estimated by the G intensity estimating unit 311. The R channel and B channel intensity estimated by the RB intensity estimating unit 312, and the G channel intensity estimated by the G intensity estimating unit 311, are output to the signal line 319.

With the example shown in FIG. 9, the intensities of channels that do not exist are estimated for all pixels in the neighbor region. Accordingly, intensities of the channels in the 9×9 pixels corresponding to the neighbor region are output to the signal line 319. Conversely, an arrangement may be made as described below, wherein following performing smoothing in one direction, the intensity of the lacking channels alone is estimated.

Figure 11:
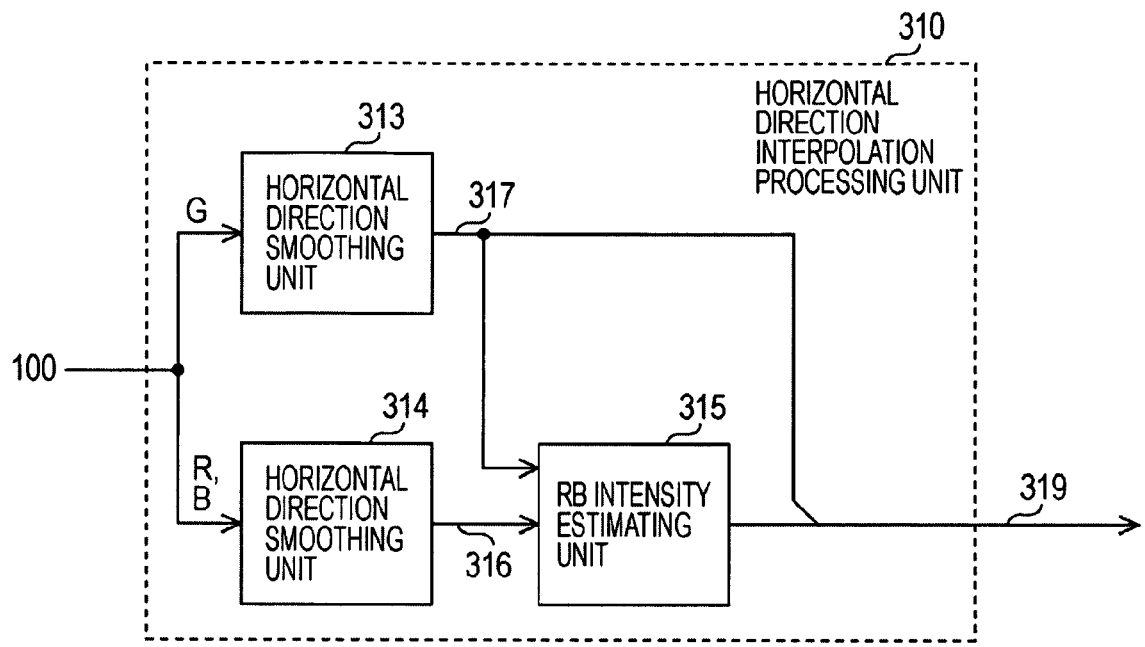
FIG. 11 is a diagram illustrating another functional configuration example of the horizontal direction interpolation processing unit 310 according to an embodiment of the present invention.

FIG. 11 is a diagram illustrating another functional configuration example of the horizontal direction interpolation processing unit 310 according to an embodiment of the present invention. This horizontal direction interpolation processing unit 310 has a horizontal direction smoothing unit 313, a horizontal direction smoothing unit 314, and an RB intensity estimating unit 315.

The horizontal direction smoothing unit 313 is for performing smoothing in the horizontal direction for the G channel included in the neighbor region of the pixel-of-interest position, at vertical sample positions. Smoothing values generated by this horizontal direction smoothing unit 313 are output to a signal line 317.

The horizontal direction smoothing unit 314 is for performing smoothing in the horizontal direction at vertical sample positions for the R channel and B channel included in the neighbor region of the pixel-of-interest position. Note that with the R channel and B channel, there are cases wherein there are no pixels of the relevant channel on a horizontal line of a given vertical sample position, so in such a case a smoothing value cannot be obtained, and the smoothing value remains non-existent. Smoothing values generated by the horizontal direction smoothing unit 314 are output to a signal line 316.

The RB intensity estimating unit 315 is for performing estimation of the intensity of the smoothing value of the R channel and B channel with the horizontal direction smoothing unit 314, using the intensity of the smoothing value of the G channel from the horizontal direction smoothing unit 313. The R channel and B channel estimation value estimated by the RB intensity estimating unit 315, and the G channel intensity smoothed by the horizontal direction smoothing unit 313, are output to the signal line 319.

With this example in FIG. 11, processing is performed smoothing the pixels of the neighbor region in the horizontal direction. Accordingly, the intensities of the channels in the 1×9 pixels obtained by smoothing the pixels of the neighbor region in the horizontal direction are output to the signal line 319. That is to say, interpolation processing can be performed at higher speeds as compared with the example in FIG. 9 by smoothing one line worth in the interpolation direction instead of interpolating each pixel in the neighbor region. Accordingly, a case of calculating chroma signal alias intensity based on the output (1×9 pixels) of the horizontal direction interpolation processing unit 310 according to the example in FIG. 11 will now be described.

Figure 12:
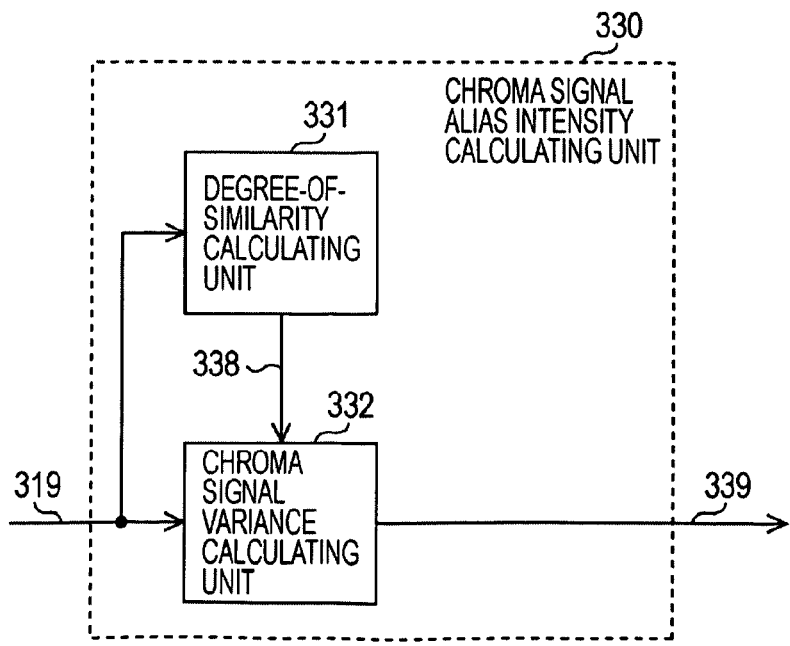
FIG. 12 is a diagram illustrating a functional configuration example of a chroma signal alias intensity calculating unit 330 according to an embodiment of the present invention.

FIG. 12 is a diagram illustrating a functional configuration example of a chroma signal alias intensity calculating unit 330 according to an embodiment of the present invention. The chroma signal alias intensity calculating unit 330 includes a degree-of-similarity calculating unit 331 and a chroma signal variance calculating unit 332.

The degree-of-similarity calculating unit 331 is for calculating the degree of similarity between the interpolation value of the line including the pixel of interest, and the interpolation value of the neighbor region. The degree-of-similarity calculating unit 331 calculates a degree of similarity $W_i$ at an i'th vertical sample position by the following expression, for example. Now, $G_{center}$ is an interpolation value of the G channel at a vertical sample position including the pixel of interest, and $G_i$ is an interpolation value of the G channel at an i'th vertical sample position. Let us say that the interpolation values of the G channel have been normalized such that the maximum value is 1.

$$w_i = 1 - |G_i - G_{center}|$$

Note that the calculation expression for degree of similarity for the degree-of-similarity calculating unit 331 is not restricted to the above expression, and the degree of similarity $W_i$ may be calculated by the following expression, for example. Here, $G_{mean}$ is the average value of the G channel interpolation values, and $G_{var}$ is the variance of the G channel interpolation values.

$$w_i = ((G_i - G_{mean}) \cdot (G_{center} - G_{mean})/G_{var}) \times 0.5 + 0.5$$

The degree of similarity obtained in this way is used for weighting for calculating variance of chroma signals at the chroma signal variance calculating unit 332.

The chroma signal variance calculating unit 332 is for calculating the weighting variance values of chroma signals. Now, a chroma signal is chrominance (color difference) of a pixel signal, and is obtained by subtracting brightness signal Y (Luminance) from the pixel signal. With the embodiment of the present invention, the color difference Cr of red and the color difference Cb of blue are calculated from the following expression. Note that Y=0.3R+0.6G+0.1B.

$$Cr = R - Y$$

$$Cb = B - Y$$

The chroma signal variance calculating unit 332 calculates the variance $V_{Cr}$ of the color difference Cr of red and the variance $V_{Cb}$ of the color difference Cb of blue by the following expressions. Here, N is the sum of samples, with N=9 in an arrangement assuming FIG. 11. Also, $Cr_i$ and $Cb_i$ are the intensity of the red and blue chroma signals at the i'th vertical sample position. The overlined symbols represent average values.

$$V_{Cr} = \frac{1}{N} \sum_{i=1}^{N} W_i (Cr_i - \overline{Cr})^2$$

$$V_{Cb} = \frac{1}{N} \sum_{i=1}^{N} W_i (Cb_i - \overline{Cb})^2$$

Consequently, the value $V = V_{Cr} + V_{Cb}$ obtained by adding the variance values of chroma signals is the alias intensity of the chroma signals. The alias intensity V is output from a signal line 339 as a horizontal direction alias intensity $V_h$.

Note that this holds true for the chroma signal alias intensity calculating unit 340 as well, with the alias intensity V being output from a signal line 349 as a vertical direction alias intensity $V_v$.

With the configuration shown in FIG. 4, interpolation processing at the direction interpolation unit 200 (processing by the horizontal direction interpolation processing unit 210 and the vertical direction interpolation processing unit 220) and interpolation processing at the direction determining unit 300 (processing by the horizontal direction interpolation processing unit 310 and the vertical direction interpolation processing unit 320) are performed independently. However, these have mutually overlapping portions, so results at one or the other can be shared. A configuration example of this case will be described below.

Figure 13:
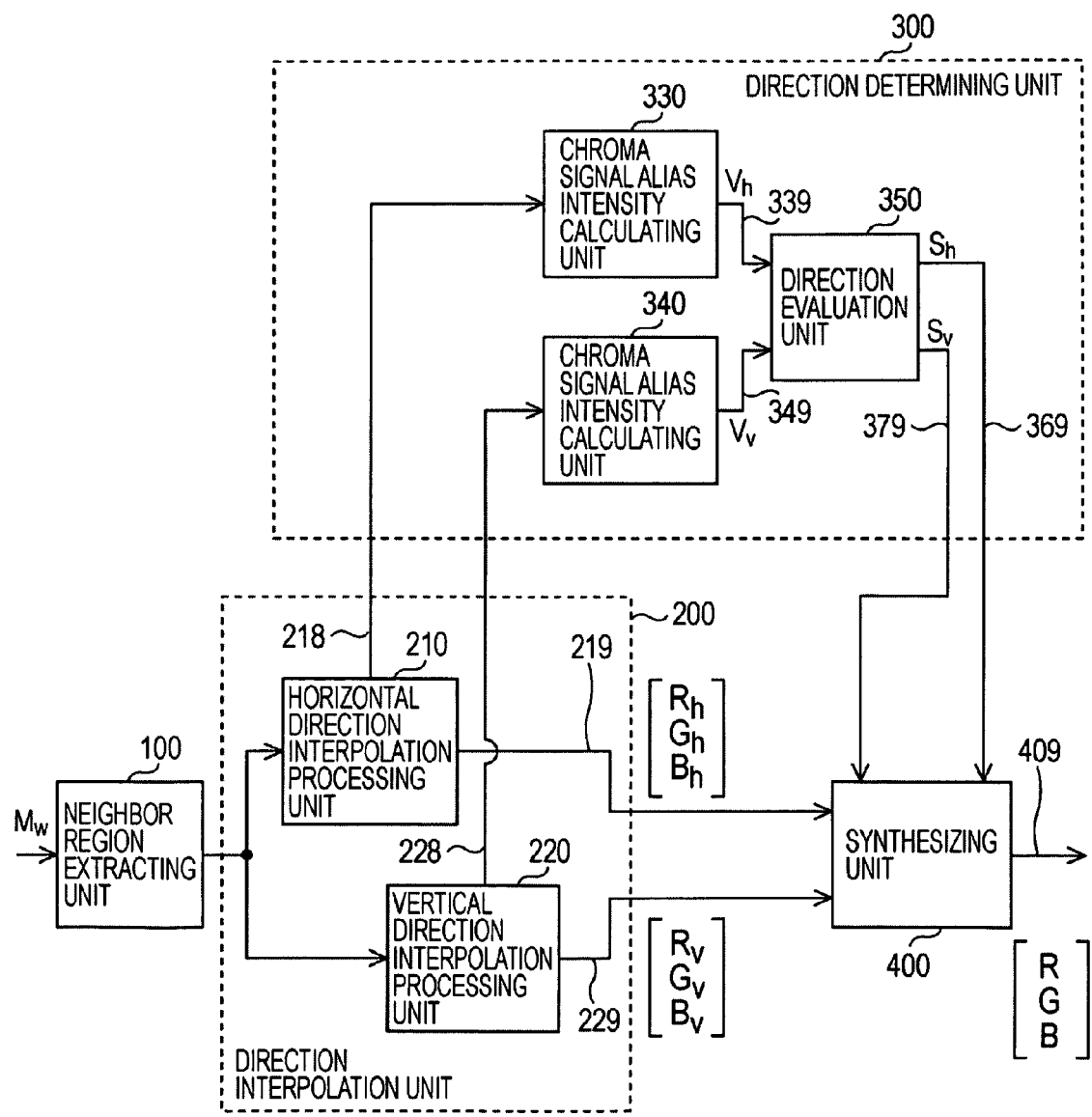
FIG. 13 is a diagram illustrating another functional configuration example of a demosaicing processing unit 232 according to an embodiment of the present invention.

FIG. 13 is a diagram illustrating another functional configuration example of a demosaicing processing unit 232 according to an embodiment of the present invention. In the example in FIG. 13, the horizontal direction interpolation processing unit 310 and the vertical direction interpolation processing unit 320 have been removed from the example in FIG. 4. Instead, the signals lines 218 and 228 from the horizontal direction interpolation processing unit 210 and the vertical direction interpolation processing unit 220 are input to the chroma signal alias intensity calculating units 330 and 340, respectively.

Figure 14:
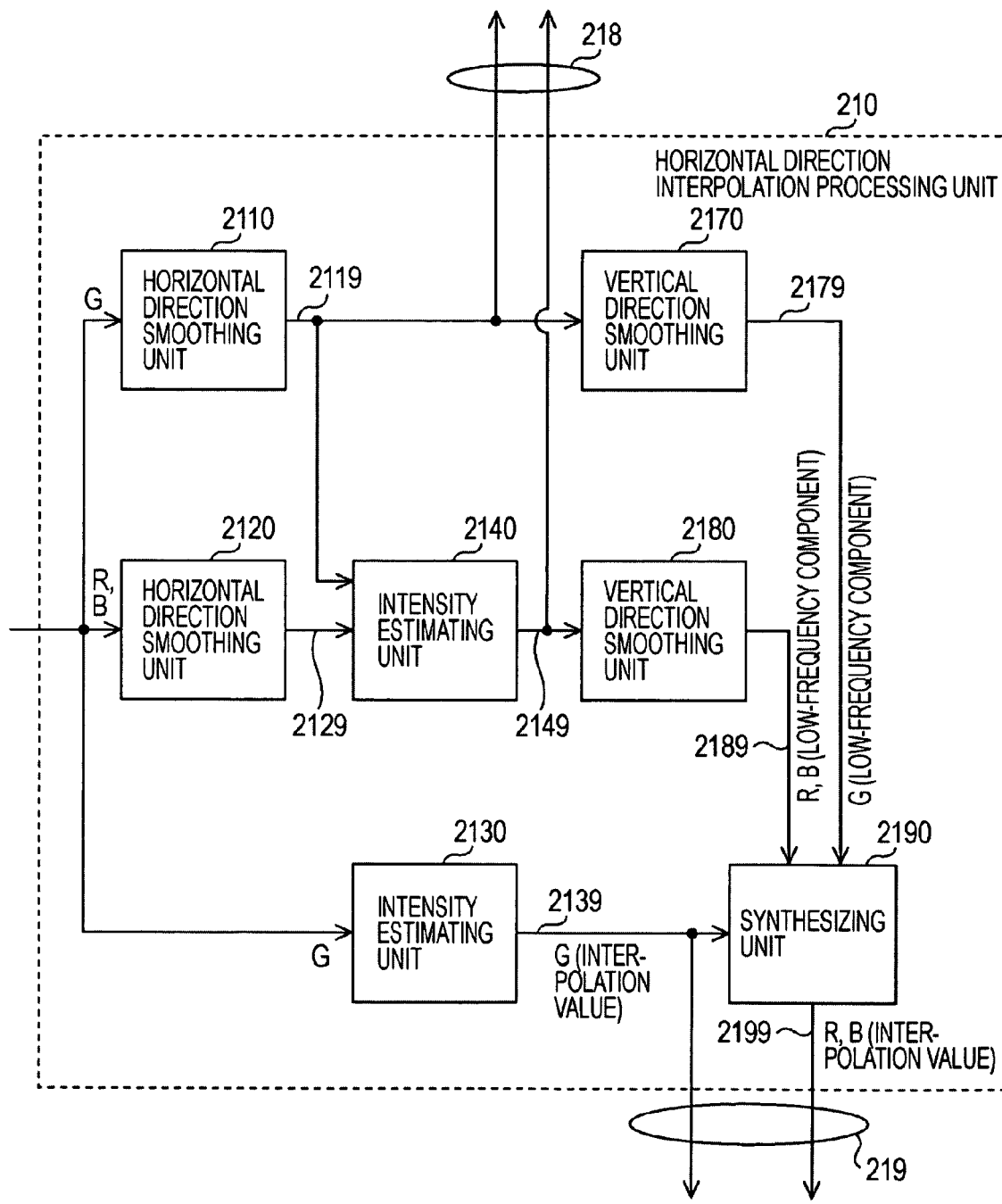
FIG. 14 is a diagram illustrating a configuration example of the horizontal direction interpolation processing unit 210 shown in FIG. 13.

FIG. 14 is a diagram illustrating a configuration example of the horizontal direction interpolation processing unit 210 shown in FIG. 13. With this horizontal direction interpolation processing unit 210, signal lines 2119 and 2149 which are input to the vertical direction smoothing units 2170 and 2180 are output as signal lines 218. Output of the signal lines 218 is equivalent to the signal line 319 in FIG. 11. Accordingly, the signals supplied to the chroma signal alias intensity calculating unit 330 is the same as in the example in FIG. 4.

Note that while description has been made regarding the horizontal direction interpolation processing unit 210, the basic configuration of the vertical direction interpolation processing unit 220 is the same, only with the horizontal direction and vertical direction inverted.

Next, the operations of the image processing device according to the embodiment of the present invention will be described with reference to the drawings.

Figure 15:
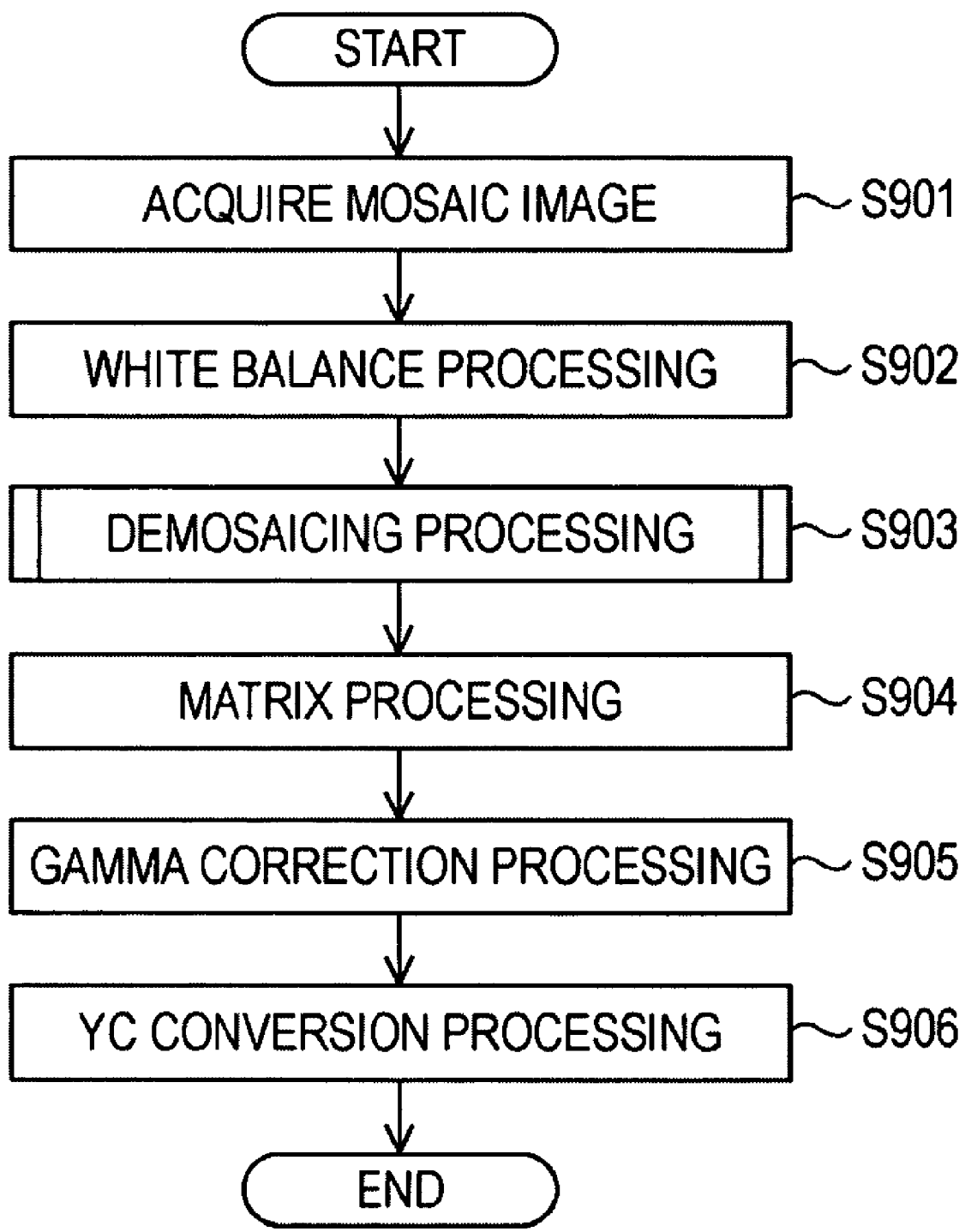
FIG. 15 is a diagram illustrating a processing procedure example of an image processing circuit 23 according to an embodiment of the present invention.

FIG. 15 is a diagram illustrating a processing procedure example of the image processing circuit 23 according to the embodiment of the present invention. Upon a mosaic image being acquired from the A/D conversion circuit 22 (step S901), the white balance processing unit 231 subjects the mosaic image to white balance processing (step S902). The demosaicing processing unit 232 performs interpolation processing (demosaicing processing) so that the intensity of all of the channels R, G, and B are present for all pixels of the mosaic image which has been subjected to white valance (Step S903). The matrix processing unit 233 applies a linear matrix to each of the pixels in the output of the demosaicing processing unit 232, and converts in to three-primary-color intensity values (step S904). The gamma correction unit 234 subjects the matrix-processed intensity values to gamma correction (step S905). The YC conversion unit 235 subjects the gamma-corrected three-channel image to matrix processing and chroma component band limiting, thereby outputting brightness signal (Y) and color-difference signals (Cr, Cb) (step S906).

Figure 16:
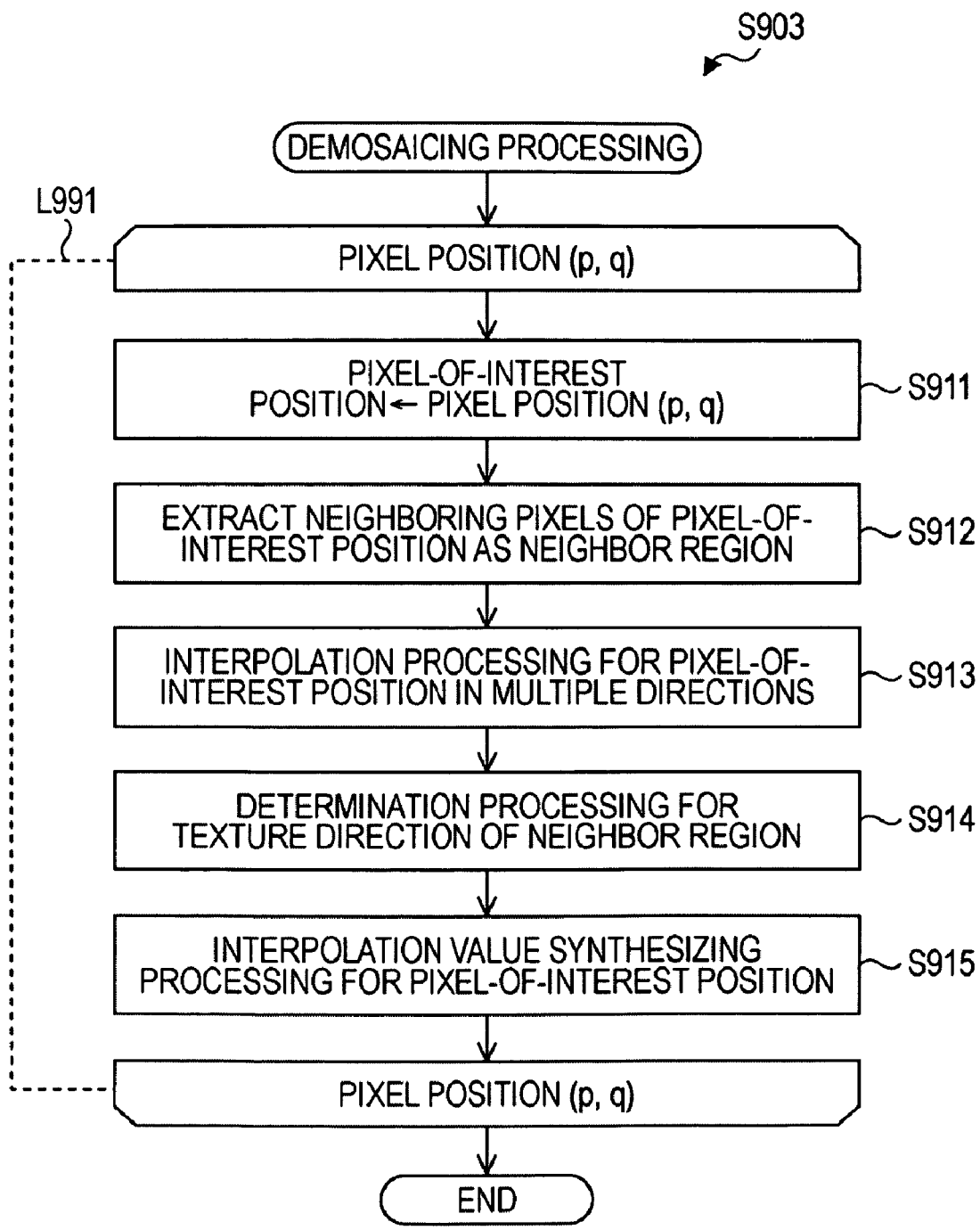
FIG. 16 is a diagram illustrating a processing procedure example of the demosaicing processing by the demosaicing processing unit 232 according to an embodiment of the present invention.

FIG. 16 is a diagram illustrating a processing procedure example of demosaicing processing (step S903 in FIG. 15) by the demosaicing processing unit 232 according to the embodiment of the present invention. Demosaicing processing is processing for sequentially interpolating or estimating the intensity of color that does not exist at each color position, so that all colors exist at all pixel positions. This processing is realized by repeating loop L991 for each pixel position (p, q) (wherein p=1 through m, q=1 through n).

First, a current pixel position (p, q) is set as the pixel-of-interest position (step S911), whereupon the neighbor region extracting unit 100 extracts, from the mosaic image subjected to while balance processing, a neighbor region of a predetermined size around the pixel-of-interest position (e.g., 9×9) (step S912). The direction interpolation unit 200 performs interpolation processing along each of multiple directions regarding the pixel-of-interest position, and outputs interpolation results for each of the multiple directions (step S913). The direction determining unit 300 determines texture direction for the pixel-of-interest position, and instructs how to synthesize the interpolation values along the multiple directions (step S914). The synthesizing unit 400 synthesizes the interpolation values output by the direction interpolation unit 200, based on the weight of interpolation values output by the direction determining unit 300, and outputs as an interpolation value of the pixel-of-interest position (step S915).

Figure 17:
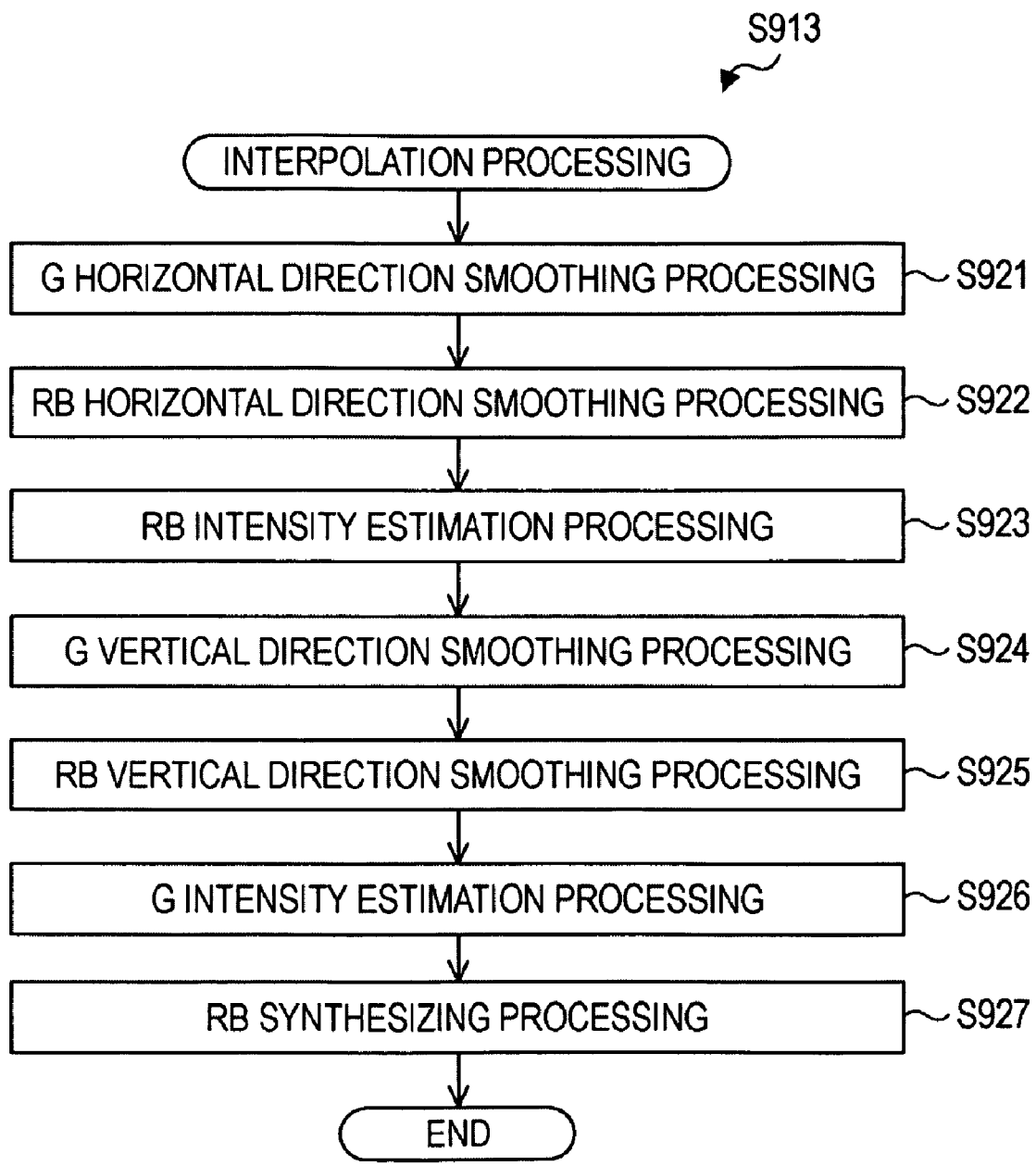
FIG. 17 is a diagram illustrating a processing procedure example of interpolation processing with a direction interpolation unit 200 according to an embodiment of the present invention.

FIG. 17 is a diagram illustrating a processing procedure example of interpolation processing (step S913 in FIG. 16) with the direction interpolation unit 200 according to the embodiment of the present invention. The horizontal direction smoothing unit 2110 performs horizontal direction smoothing at vertical sample positions for the G channel of the RGB channels included in the neighbor region of the pixel-of-interest position (step S921). Also, the horizontal direction smoothing unit 2120 performs smoothing in the horizontal direction at vertical sample positions for the R channel and B channel of the RGB channels included in the neighbor region of the pixel-of-interest position (step S922). The intensity estimating unit 2140 performs estimation of the intensity of the smoothing values of the R channel and B channel from the horizontal direction smoothing unit 2120 by the intensity of the G channel smoothing value from the horizontal direction smoothing unit 2110 (step S923).

The vertical direction smoothing unit 2170 further smoothes, in the vertical direction, the intensity of the horizontal direction smoothing value of the G channel from the horizontal direction smoothing unit 2110 (step S924). Also, the vertical direction smoothing unit 2180 further smoothes, in the vertical direction, the intensity of the horizontal direction smoothing value of the R channel and B channel that has been interpolated, from the intensity estimating unit 2140 (step S925).

Also, the intensity estimating unit 2130 performs estimation of the intensity of the pixel-of-interest position, for the G channel of the RGB channels included in the neighbor region of the pixel-of-interest position (step S926). The synthesizing unit 2190 then synthesizes the intensities of the R channel and B channel of the pixel-of-interest position, based on the low-frequency component of the G channel from the vertical direction smoothing unit 2170, the low-frequency component of the R channel and B channel from the vertical direction smoothing unit 2180, and the G channel interpolation value from the intensity estimating unit 2130 (step S927).

Note that these procedures may be executed in different order as long as they follow the relation of dependence of operations in FIG. 5.

Figure 18:
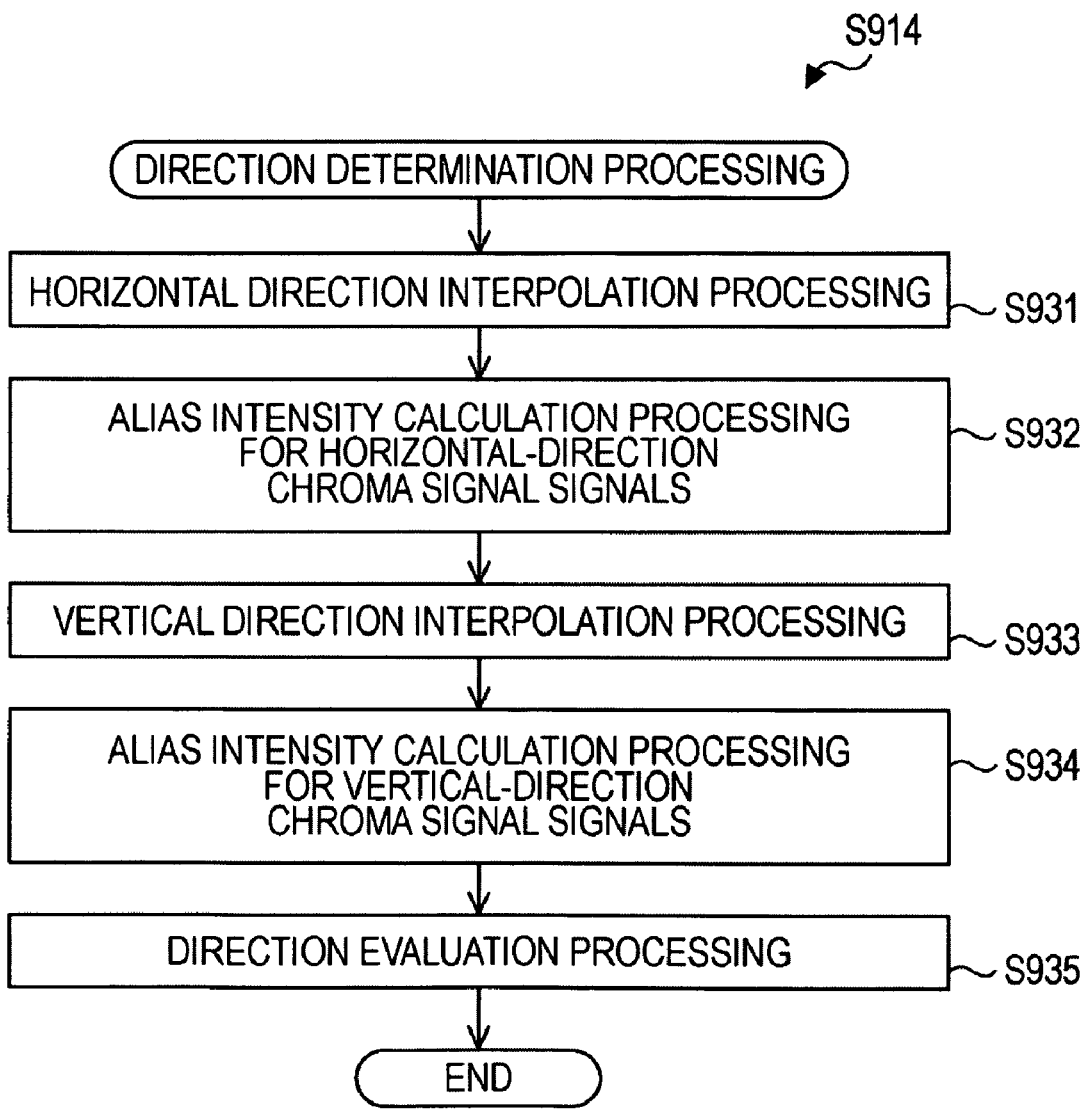
FIG. 18 is a diagram illustrating a processing procedure example of texture direction determination processing with a direction determination unit 300 according to an embodiment of the present invention.

FIG. 18 is a diagram illustrating a processing procedure example of texture direction determination processing (step S914 in FIG. 16) with the direction determining unit 300 according to the embodiment of the present invention. The horizontal direction interpolation processing unit 310 performs interpolation processing following the horizontal direction (step S931). The chroma signal alias intensity calculating unit 330 calculates the alias intensity of the chroma signals included in the interpolation values in the horizontal direction (Step S932).

Also, the vertical direction interpolation processing unit 320 performs interpolation processing following the vertical direction (step S933). The chroma signal alias intensity calculating unit 340 calculates the alias intensity of the chroma signals included in the interpolation values in the vertical direction (Step S934).

The direction evaluation unit 350 calculates the weights of the interpolation values in the horizontal direction and vertical direction, based on the horizontal-direction and vertical-direction alias intensities (step S935).

Note that these procedures may be executed in different order as long as they follow the relation of dependence of operations in FIG. 4.

Figure 19:
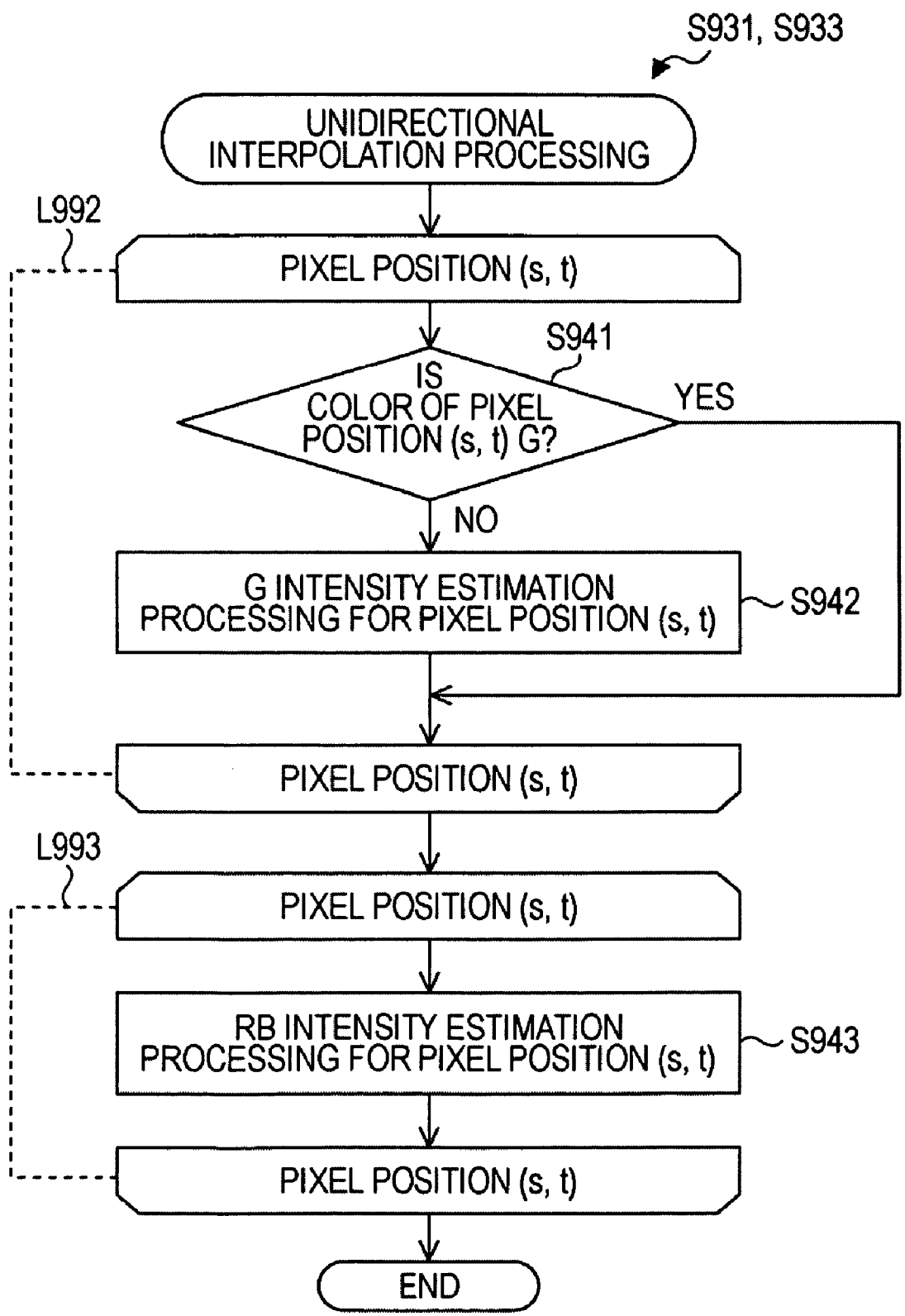
FIG. 19 is a diagram illustrating a processing procedure example of unidirectional interpolation processing with the horizontal direction interpolation processing unit 310 and a vertical direction interpolation processing unit 320 according to an embodiment of the present invention.

FIG. 19 is a diagram illustrating a processing procedure example of unidirectional interpolation processing (steps S931 and S933 in FIG. 18) with the horizontal direction interpolation processing unit 310 and the vertical direction interpolation processing unit 320 according to the embodiment of the present invention. The horizontal direction interpolation processing unit 310 in FIG. 9 performs interpolation processing so that R, G, and B signals are all present for all pixels in then neighbor region. This processing is realized by repeating loops L992 and L993 for each pixel position (s, t) (wherein s=1 through 9, t=1 through 9 with the embodiment of the present invention).

In loop L992, in the event that the color of the pixel position (s, t) is not G (step S941), the G intensity estimating unit 311 estimates the intensity of the G channel at the pixel position (s, t) (step S942). Upon the processing of step S941 having been performed for all pixels within the neighbor region, the loop L992 ends, and goes to loop L993.

In loop L 993, at the pixel position (s, t), the RB intensity estimating unit 312 estimates the R channel and B channel each for positions with no R channel or B channel pixels (step S943). Upon R, G, and B being present for all pixels in the neighbor region, the unidirectional interpolation processing ends.

Note that the processing of the vertical direction interpolation processing unit 320 is the same as the processing of the horizontal direction interpolation processing unit 310, only with the horizontal direction and vertical direction inverted.

Figure 20:
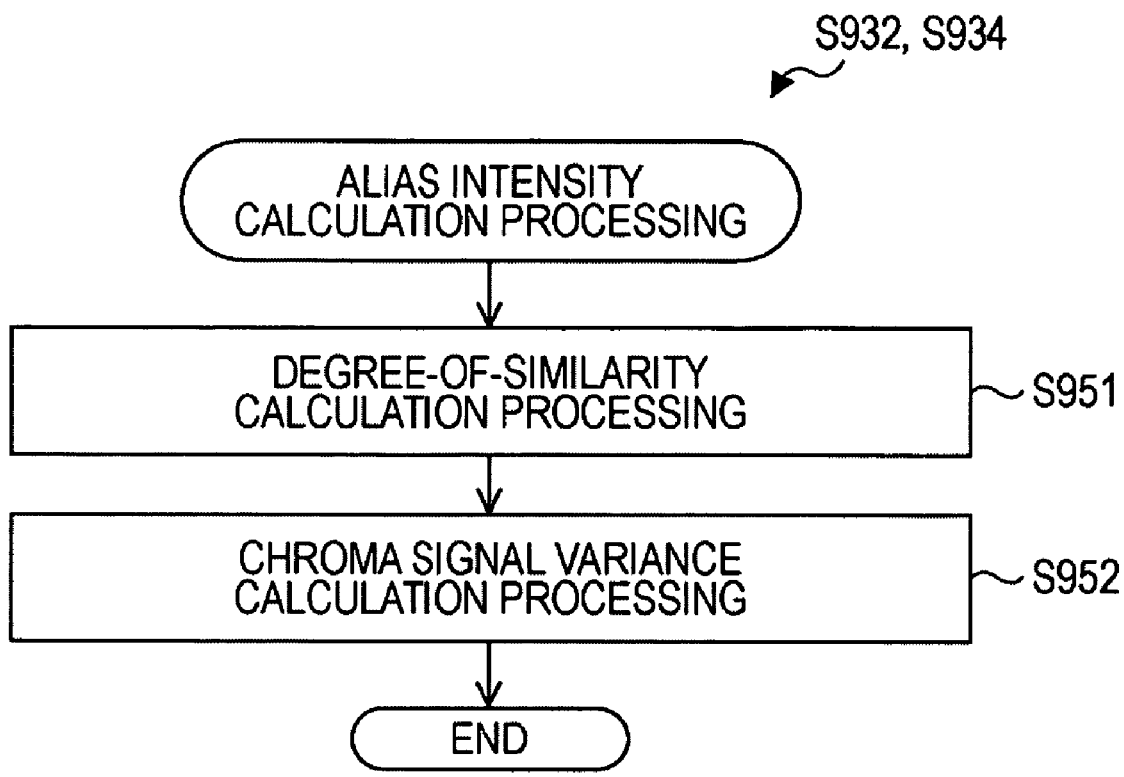
FIG. 20 is a diagram illustrating a processing procedure example of chroma signal alias intensity calculation processing with chroma signal alias intensity calculating units 330 and 340 according to an embodiment of the present invention.

FIG. 20 is a diagram illustrating a processing procedure example of chroma signal alias intensity calculation processing (steps S932 and S934 in FIG. 18) with the chroma signal alias intensity calculating units 330 and 340 according to the embodiment of the present invention.

In the chroma signal alias intensity calculating unit 330, the degree-of-similarity calculating unit 331 calculates the degree of similarity between the interpolation value of the line including the pixel of interest, and the interpolation value of the neighbor region (step S951). The chroma signal variance calculating unit 332 then calculates the weighting variance values of chroma signals (step S952).

Note that the processing of the chroma signal alias intensity calculating unit 340 is the same as the processing of the chroma signal alias intensity calculating unit 330, only with the horizontal direction and vertical direction inverted.

While an example of using the Bayer array three-primary-color filter shown in FIG. 3 has been described with the embodiment of the present invention, the present invention is applicable to other color arrays as well. For example, this may be a four-color array wherein an E (emerald) filter has been added in addition to RGB, as shown in FIG. 21A. This four-color array is an array wherein half of the B pixel positions in a three-color Bayer array have been replaced with those with somewhat differing spectral properties. In the case of this four-color array, the interpolation values of the channels R, G, B, and E can be calculated with the direction interpolation unit 200, and the interpolation values be synthesized at the synthesizing unit 400 based on the texture direction determined at the direction determining unit 300.

With this four-color array, G color pixels are disposed in checkerboard fashion, with R color pixels being disposed in a square-grid pattern of every other pixel in the horizontal direction and vertical direction at other pixel positions, and B and E color pixels being disposed in a diagonal grid pattern of every other pixel in the diagonal direction at remaining pixel positions.

The G color is a filter color of spectral properties close to the human visibility curve. The R color is a filter color of spectral properties having sensitivity toward the relatively long wavelength side. On the other hand, the B and E colors are filter colors of spectral properties having sensitivity toward the relatively short wavelength side.

This four-color array can be generalized as shown in FIG. 21B. In the example above, G is equivalent to C1, R is equivalent to C2, B is equivalent to C3, and E is equivalent to C4. These can be sectioned into a first channel (C1) disposed in checkerboard fashion, and a second channel (C2 through C4) which is the rest. With the first channel, the color exists regarding which direction smoothing is performed, either the horizontal direction or vertical direction. In the other hand, with the second channel, in the event of smoothing in one of the horizontal direction or vertical direction, there may be cases where that color does not exist. In this case, the intensity of the second channel can be estimated using the intensity of the first channel.

This also holds true for arrays of five or more colors. That is to say, as long as the first channel is disposed in checkerboard fashion, the second channel can include four or more colors arrayed in an orderly fashion.

Now, while a filter color of spectral properties close to the human visibility curve has been assumed as the first channel disposed in checkerboard fashion, the invention is not restricted to this, and this may be a filter color having spectral sensitivity to infrared rays as well. As an example of such, a plain filter which passes light rays of all colors can be conceived.

Also, while the embodiment of the present invention has assumed that the pixels are arrayed systematically in the horizontal direction and vertical direction, the invention is not restricted to this, and may be disposed at a 45° inclination, for example.

Also, while the embodiment of the present invention has assumed that the texture direction is to be determined by interpolation in the horizontal direction and vertical direction, the invention is not restricted to this, and in addition to the horizontal direction and vertical direction, interpolation and texture direction determination may be performed in the lower-left-to-upper-right direction (ascending) and upper-left-to-lower-right direction (descending).

In this way, according to the embodiment of the present invention, using the alias intensity of chroma signals at the time of evaluating the texture direction for synthesizing interpolation values generated by the direction interpolation unit 200 at the synthesizing unit 400 enables the interpolation direction to be correctly evaluated even in images including high-frequency components with high color saturation such as a colored stripe pattern for example, and occurrence of false color can be suppressed.

Also, the embodiment of the present invention illustrates an example for carrying out the present invention, and has correlation with the claimed elements of the invention, but the invention is not restricted to this embodiment, and various modifications may be made without departing from the essence of the present invention.

That is to say, the interpolation unit described in the Summary of the Invention corresponds to, for example, the horizontal direction interpolation processing unit 310 and vertical direction interpolation processing unit 320. Also, the chroma signal alias intensity calculating unit described in the Summary of the Invention corresponds to, for example, the chroma signal alias intensity calculating units 330 and 340. Also, the direction evaluation unit described in the Summary of the Invention corresponds to, for example, the direction evaluation unit 350.

Also, the weighting calculating unit described in the Summary of the Invention corresponds to, for example, the degree-of-similarity calculating unit 331. Also, the statistics calculating unit described in the Summary of the Invention corresponds to, for example, the chroma signal variance calculating unit 332.

Also, the smoothing unit described in the Summary of the Invention corresponds to, for example, the horizontal direction smoothing units 313 and 314. Also, the interpolation value generating unit described in the Summary of the Invention corresponds to, for example, the RB intensity estimating unit 315.

The first interpolation unit described in the Summary of the Invention also corresponds to, for example, the horizontal direction interpolation processing unit 310 and vertical direction interpolation processing unit 320. Also, the second interpolation unit described in the Summary of the Invention corresponds to, for example, the horizontal direction interpolation processing unit 210 and the vertical direction interpolation processing unit 220. Also, the synthesizing unit described in the Summary of the Invention corresponds to, for example, the synthesizing unit 400. Also, the imaging unit described in the Summary of the Invention corresponds to, for example, the imaging device 13.

Also, the particular color corresponds to, for example, the G (green) color. Also, the first color corresponds to, for example, the R (red) color. Also, the second color corresponds to, for example, the B (blue) color. Also, the third color corresponds to, for example, the E (emerald) color.

Also, the interpolation procedure described in the Summary of the Invention corresponds to, for example, steps S931 and S933. Also, the chroma signal alias intensity calculating procedure described in the Summary of the Invention corresponds to, for example, steps S932 and S934. Also, the direction evaluating procedure described in the Summary of the Invention corresponds to, for example, step S935.

The processing procedures described in the embodiment of the present invention may be taken as a method having the series of procedures, or may be taken as a program for causing a computer to execute the series of procedures or a recording medium storing the program.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
   interpolation means configured to perform interpolation along each of a plurality of directions in a neighbor region of a predetermined pixel of interest in an input image, and generate interpolation values for each of the plurality of directions;
   chroma signal alias intensity calculating means configured to calculate alias intensities of chroma signals from interpolation values of each of said plurality of directions; and
   direction evaluation means configured to generate, for each of the plurality of directions, evaluation values, wherein the evaluation values are generated based on the alias intensity of the chroma signals in a direction of said plurality of directions in accordance with a ratio of the alias intensities of the chroma signals for the plurality of directions.

2. The image processing device according to claim 1, wherein said chroma signal alias intensity calculating means calculate said alias intensity based on statistics of chroma signals of the interpolation values of each of said plurality of directions.

3. The image processing device according to claim 2, said chroma signal alias intensity calculating means comprising:
   weighting calculating means configured to calculate weighting corresponding to each component of the interpolation values of each of said plurality of directions; and
   statistic calculating means configured to calculate said statistics from the interpolation values of each of said plurality of directions, in accordance with said weighting.

4. The image processing device according to claim 3, wherein said weighting means calculate a degree-of-similarity between components corresponding to said predetermined pixel-of-interest in the interpolation values of each of said plurality of directions, and other components, as said weighting.

5. The image processing device according to claim 2, wherein said chroma signal alias intensity calculating means calculate a variance of said chroma signals as said statistics of chroma signals.

6. The image processing device according to claim 1, wherein said direction evaluation means compare the relation in magnitude of the alias intensities of chroma signals for each of said plurality of directions, and set the evaluation value of the direction with the smallest alias intensity so as to be higher than a predetermined value, and set the evaluation values of the remaining directions so as to be lower than the predetermined value.

7. The image processing device according to claim 1, wherein said plurality of directions is a combination of two or more of the horizontal direction, vertical direction, lower-left-to-upper-right direction, and upper-left-to-lower-right direction.

8. An image processing device comprising:
   imaging means configured to image a subject and generate an input image;
   interpolation means configured to perform interpolation along each of a plurality of directions in a neighbor region of a predetermined pixel of interest in an input image, and generate interpolation values for each of the plurality of directions;
   chroma signal alias intensity calculating means configured to calculate alias intensities of chroma signals from the interpolation values of each of said plurality of directions; and
   direction evaluation means configured to generate, for each of the plurality of directions, evaluation values, wherein the evaluation values are generated based on the alias intensity of the chroma signals of said plurality of directions in accordance with a ratio of the alias intensities of the chroma signals for the plurality of directions.

9. An image processing method comprising:
   performing interpolation along each of a plurality of directions in a neighbor region of a predetermined pixel of interest in an input image, and generate interpolation values for each of the plurality of directions;
   calculating alias intensities of chroma signals from the interpolation values of each of said plurality of directions; and
   generating, for each of the plurality of directions, evaluation values, wherein the evaluation values are generated based on the alias intensity of the chroma signals of said plurality of directions in accordance with a ratio of the alias intensities of the chroma signals for the plurality of directions.

10. A non-transitory computer-readable storage medium storing a computer program that, when executed by a computer, causes the computer to perform a method comprising:
    performing interpolation along each of a plurality of directions in a neighbor region of a predetermined pixel of interest in an input image, and generate interpolation values for each of the plurality of directions;
    calculating alias intensities of chroma signals from the interpolation values of each of said plurality of directions; and
    generating, for each of the plurality of directions, evaluation values, wherein the evaluation values are generated based on the alias intensity of the chroma signals of said plurality of directions in accordance with a ratio of the alias intensities of the chroma signals for the plurality of directions.

11. An image processing device comprising:
    an interpolation unit configured to perform interpolation along each of a plurality of directions in a neighbor region of a predetermined pixel of interest in an input image, and generate interpolation values for each of the plurality of directions;

a chroma signal alias intensity calculating unit configured to calculate alias intensities of chroma signals from the interpolation values of each of said plurality of directions; and a direction evaluation unit configured to generate, for each of the plurality of directions, evaluation values, wherein the evaluation values are generated based on the alias intensity of the chroma signals of said plurality of directions in accordance with a ratio of the alias intensities of the chroma signals for the plurality of directions.

12. An image processing device comprising:

an imaging unit configured to image a subject and generate an input image;

an interpolation unit configured to perform interpolation along each of a plurality of directions in a neighbor region of a predetermined pixel of interest in an input image, and generate interpolation values for each of the plurality of directions;

a chroma signal alias intensity calculating unit configured to calculate alias intensities of chroma signals from the interpolation values of each of said plurality of directions; and a direction evaluation unit configured to generate, for each of the plurality of directions, evaluation values, wherein the evaluation values are generated based on the alias intensity of the chroma signals of said plurality of directions in accordance with a ratio of the alias intensities of the chroma signals for the plurality of directions.

* * * * *